United States Patent
Kameyama et al.

(10) Patent No.: US 9,605,352 B2
(45) Date of Patent: Mar. 28, 2017

(54) CATION EXCHANGE MEMBRANE, ELECTROLYSIS VESSEL USING THE SAME AND METHOD FOR PRODUCING CATION EXCHANGE MEMBRANE

(71) Applicant: ASAHI KASEI CHEMICALS CORPORATION, Tokyo (JP)

(72) Inventors: Hiroyuki Kameyama, Tokyo (JP);
Manabu Sugimoto, Tokyo (JP);
Yoshifumi Kado, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 379 days.

(21) Appl. No.: 14/476,211

(22) Filed: Sep. 3, 2014

(65) Prior Publication Data
US 2014/0367355 A1    Dec. 18, 2014

Related U.S. Application Data

(62) Division of application No. 13/503,975, filed as application No. PCT/JP2010/068855 on Oct. 25, 2010, now Pat. No. 9,133,557.

(30) Foreign Application Priority Data

Oct. 26, 2009  (JP) ................................. 2009-245869

(51) Int. Cl.
*C25B 13/02* (2006.01)
*C08J 5/22* (2006.01)
(Continued)

(52) U.S. Cl.
CPC ............. *C25B 13/02* (2013.01); *C08J 5/2206* (2013.01); *C25B 13/08* (2013.01); *H01M 8/106* (2013.01);
(Continued)

(58) Field of Classification Search
CPC ........ C25B 13/02; C25B 13/08; C08J 5/2206; C08J 2327/12; H01M 8/1067;
(Continued)

(56) References Cited

U.S. PATENT DOCUMENTS 4,021,327 A   5/1977  Grot
4,218,542 A   8/1980  Ukihashi et al.
(Continued)

FOREIGN PATENT DOCUMENTS

CN   1633465   6/2005
CN   1774829   5/2006
(Continued)

OTHER PUBLICATIONS

Search report from International Application No. PCT/JP2010/068855, mail date is Jan. 25, 2011.
(Continued)

*Primary Examiner* — Anita Alanko
(74) *Attorney, Agent, or Firm* — Greenblum & Bernstein, P.L.C.

(57) ABSTRACT

Provided is a cation exchange membrane having excellent mechanical strength against folding and the like and capable of delivering stable electrolytic performance for a long time, an electrolysis vessel using the cation exchange membrane and a method for producing the cation exchange membrane. A cation exchange membrane 1 at least includes: a membrane body containing a fluorine-based polymer having an ion-exchange group; and two or more reinforcing core materials arranged approximately in parallel within the membrane body. The membrane body is provided with two or more elution holes 12 formed between the reinforcing core materials 10 adjacent to each other. In addition, assuming that a distance between the reinforcing core materials 10 adjacent to each other is represented by a, a distance (Continued)

between the reinforcing core materials 10 and the elution holes 12 adjacent to each other is represented by b, a distance between the elution holes 12 adjacent to each other is represented by c, and the number of the elution holes 12 formed between the reinforcing core materials 10 adjacent to each other is represented by n, then a, b, c, and n satisfying the relationship represented by the following expression (1) or expression (2) are at least present.

$$b > a/(n+1) \quad (1)$$

$$c > a/(n+1) \quad (2)$$

1 Claim, 10 Drawing Sheets

(51) Int. Cl.
H01M 8/1067 (2016.01)
H01M 8/1039 (2016.01)
H01M 8/1053 (2016.01)
H01M 8/106 (2016.01)
H01M 8/1062 (2016.01)
H01M 8/1069 (2016.01)
C25B 13/08 (2006.01)
H01M 8/1023 (2016.01)
C09K 13/00 (2006.01)

(52) U.S. Cl.
CPC ....... H01M 8/1023 (2013.01); H01M 8/1039 (2013.01); H01M 8/1053 (2013.01); H01M 8/1062 (2013.01); H01M 8/1067 (2013.01); H01M 8/1079 (2013.01); C08J 2327/12 (2013.01); C09K 13/00 (2013.01); H01M 8/1076 (2013.01); H01M 2300/0082 (2013.01); Y02E 60/521 (2013.01); Y02P 70/56 (2015.11)

(58) Field of Classification Search
CPC ............. H01M 8/1023; H01M 8/1039; H01M 8/1053; H01M 8/106; H01M 8/1062; H01M 8/1079; H01M 8/1076; H01M 2300/0082; C09K 13/00; Y02P 70/56; Y02E 60/521
See application file for complete search history.

(56) References Cited

U.S. PATENT DOCUMENTS

| 4,337,141 | A | | 6/1982 | Watanabe et al. |
| 4,437,951 | A | * | 3/1984 | Bissot .................. C25B 13/08 204/263 |
| 5,264,100 | A | | 11/1993 | Shimohira et al. |
| 5,384,019 | A | * | 1/1995 | Keating .................. C25B 13/00 204/252 |
| 6,756,328 | B2 | | 6/2004 | Sakura et al. |
| 2002/0034904 | A1 | | 3/2002 | Sakuma et al. |
| 2003/0008198 | A1 | | 1/2003 | Mukoyama |
| 2005/0095486 | A1 | | 5/2005 | Hamamoto et al. |
| 2006/0046121 | A1 | | 3/2006 | Shimohira et al. |
| 2006/0068258 | A1 | | 3/2006 | Kinoshita |
| 2009/0120788 | A1 | | 5/2009 | Kashiwada et al. |
| 2014/0360868 | A1 | * | 12/2014 | Yamaki .................. B01J 39/20 204/296 |

FOREIGN PATENT DOCUMENTS

| CN | 101006599 | 7/2007 |
| CN | 101263245 | 9/2008 |
| EP | 0 165 466 | 5/1985 |
| EP | 0 507 235 | 10/1992 |
| JP | 51-131489 | 11/1976 |
| JP | 4-308096 | 10/1992 |
| JP | 2002-79114 | 3/2002 |
| JP | 2002-249604 | 9/2002 |
| JP | 2009-245869 | 10/2009 |

OTHER PUBLICATIONS

International Preliminary Report on Patentability and Written Opinion from International Application No. PCT/JP2010/068855, mail date is May 18, 2012.
Taiwanese Office Action issued with respect to counterpart Taiwanese Application No. 099136589, dated Mar. 13, 2013.
Chinese office action of Chinese app. No. 201080047549.6 dated Jun. 27, 2013.
Tongwen Xu, "Ion exchange membrances", State of their development and perspective, Journal of Membrane Science, vol. 263 (2005), pp. 1-29 [p. 3, right column, lines 8-15; p. 5, left column, line 14- p. 5, right column, line 1].
Extended European Search Report for corresponding European Patent Application No. 10826670 1, mailed on Sep. 10, 2013.

* cited by examiner

CATION EXCHANGE MEMBRANE, ELECTROLYSIS VESSEL USING THE SAME AND METHOD FOR PRODUCING CATION EXCHANGE MEMBRANE

The present application is a divisional of U.S. application Ser. No. 13/503,975, which is a National stage of International Patent Application No. PCT/JP2010/068855 filed Oct. 25, 2010, which claims priority to Japanese Application No. 2009-245869 filed Oct. 26, 2009. The disclosures of U.S. application Ser. No. 13/503,975 and International Patent Application No. PCT/JP2010/068855 are incorporated by reference herein in their entireties.

TECHNICAL FIELD

The present invention relates to a cation exchange membrane, an electrolysis vessel using the same and a method for producing the cation exchange membrane.

BACKGROUND ART

A fluorine-containing ion exchange membrane is excellent in e.g., heat resistance and chemical resistance. Therefore, the fluorine-containing ion exchange membrane has been used not only as a cation exchange membrane for alkali chloride electrolysis for producing chlorine and an alkali but also a diaphragm for generating ozone, a fuel cell, wide variety of diaphragms for electrolysis such as water electrolysis and hydrochloric acid electrolysis. Of them, the membrane for use in alkali chloride electrolysis is demanded to, e.g., increase current efficiency in view of productivity, reduce electrolysis voltage in view of economic efficiency and reduce the concentration of sodium chloride in caustic soda in view of quality of a product.

Of these demands, in order to increase current efficiency, an ion exchange membrane formed of at least two layers, i.e., a carboxylic acid layer using a carboxylic acid group having high anion elimination property as an ion-exchange group and a sulfonic acid layer using a low resistant sulfonic acid group as an ion-exchange group, is generally used. Since these ion exchange membranes are brought into direct contact with chlorine and caustic soda of from 80 to 90° C. during an electrolysis operation, a fluorine-based polymer having extremely high chemical resistance is used as a material for the ion exchange membrane. However, the ion exchange membrane formed of such a fluorine-based polymer alone does not have sufficient mechanical strength. Therefore, the membrane is reinforced, for example, by embedding a woven fabric contained of polytetrafluoroethylene (PTFE) in the membrane, as a reinforcing core material.

For example, Patent Document 1 proposes a fluorine-based cation exchange membrane for electrolysis composed of a first layer, which is formed of a fluorine-based polymer film having a cation-exchange group and reinforced with the woven fabric, and a second layer, which is formed of a fluorine based polymer having a carboxylic acid group and positioned on the cathode side, in which $\geq \frac{1}{2}$ of the thickness of a porous base material is projected from the first layer toward the anode side, the projecting part of the porous base material is covered with a coating layer of the fluorine-based polymer having the cation-exchange group so as to integrate into the first layer and to form the convexo-concaves along with the surface shape of the porous base material on the anode side surface.

Patent Document 1: Japanese Patent Application Laid-Open No. 4-308096

SUMMARY OF THE INVENTION

Problems to be Solved by the Invention

However, the reinforcing core material acts as a blocking material for a cation such as alkali ion when flowing from the anode side to the cathode side within the membrane thereby preventing the cation from flowing from the anode side to the cathode side smoothly. To solve this phenomenon, a hole (hereinafter, referred to as an "elution hole") is formed in the cation exchange membrane for ensuring a flow channel for e.g., a cation and an electrolyte and used as an electrolyte flow channel. In this manner, the electrical resistance of the cation exchange membrane is expected to be reduced. However, the strength of the cation exchange membrane is reduced by the presence of the elution hole. Particularly, in the case where the cation exchange membrane is mounted to an electrolysis vessel and the case where the cation exchange membrane is carried, the cation exchange membrane folds or bends thereby generating a problem of likely developing a pinhole from the elution hole. In the cation exchange membrane disclosed in Patent Document 1, the reinforcing core material projects from the cation exchange membrane. Therefore, when the cation exchange membrane rubs against an electrode or the like due to e.g., vibration within an electrolysis vessel, a resin covering the reinforcing core material is peeled off and the reinforcing core material is exposed therefrom, causing a problem of losing the function as a reinforcing member.

In addition, when the cation exchange membrane is mounted to the electrolysis vessel to perform electrolysis, reduction in voltage (electrolysis voltage) required for electrolysis is demanded. To realize this, the cation exchange membrane has desirably low resistance. Furthermore, the cation exchange membrane capable of delivering stable electrolytic performance for a long time is desired.

The present invention has been made in view of the aforementioned circumstances. It is a main object of the present invention is to provide a cation exchange membrane having excellent mechanical strength against folding or the like, delivering stable electrolytic performance for a long time, an electrolysis vessel using the cation exchange membrane and a method for producing the cation exchange membrane.

Means for Solving the Problems

The present inventors have made intensive studies with the view for attaining the aforementioned objects. As a result, they found that aforementioned objects can be attained by a cation exchange membrane having at least a membrane body containing a fluorine-based polymer having an ion-exchange group and two or more reinforcing core materials arranged approximately in parallel within the membrane body, in which the membrane body has two or more elution holes formed between the reinforcing core materials adjacent to each other, and assuming that a distance between the reinforcing core materials adjacent to each other is represented by a; a distance between the reinforcing core materials and the elution holes adjacent to each other is represented by b; a distance between the elution holes adjacent to each other is represented by c; and the number of the elution holes formed between the reinforcing core materials adjacent to each other is represented by n, then a, b, c, and n satisfying a specific relational expression are present. Based on this, the present invention has been accomplished.

More specifically, the present invention is as follows.

[1] A cation exchange membrane at least comprising:
a membrane body containing a fluorine-based polymer having an ion-exchange group; and
two or more reinforcing core materials arranged approximately in parallel within the membrane body,
wherein the membrane body is provided with two or more elution holes formed between the reinforcing core materials adjacent to each other, and
assuming that a distance between the reinforcing core materials adjacent to each other is represented by a, a distance between the reinforcing core materials and the elution holes adjacent to each other is represented by b, a distance between the elution holes adjacent to each other is represented by c, and the number of the elution holes formed between the reinforcing core materials adjacent to each other is represented by n, then a, b, c, and n satisfying the relationship represented by the following expression (1) or expression (2) are at least present.

$$b > a/(n+1) \quad (1)$$

$$c > a/(n+1) \quad (2)$$

[2] The cation exchange membrane according to [1], wherein a, c, and n further satisfy the relationship represented by the following expression (3).

$$0.2a/(n+1) \leq c \leq 0.9a/(n+1) \quad (3)$$

[3] The cation exchange membrane according to [1] or [2], wherein a, b, and n further satisfy the relationship represented by the following expression (4).

$$a/(n+1) < b \leq 1.8a/(n+1) \quad (4)$$

[4] The cation exchange membrane according to [1] or [3], wherein a, c, and n further satisfy the relationship represented by the following expression (5).

$$1.1a/(n+1) \leq c \leq 0.8a \quad (5)$$

[5] The cation exchange membrane according to any one of [1] to [4], wherein
a first interval between the reinforcing core materials in which a, b, c, and n satisfy the relationship represented by the expression (1), and
a second interval between the reinforcing core materials in which a, b, c, and n satisfy the relationship represented by the expression (2) are alternately present.

[6] The cation exchange membrane according to [5], wherein
in the first interval between the reinforcing core materials, a, b, c, and n further satisfy the relationships represented by the following expression (3) and the following expression (4), and
in the second interval between the reinforcing core materials, a, b, c, and n further satisfy the relationship represented by the following expression (5).

$$0.2a/(n+1) \leq c \leq 0.9a/(n+1) \quad (3)$$

$$a/(n+1) < b \leq 1.8a/(n+1) \quad (4)$$

$$1.1a/(n+1) \leq c \leq 0.8a \quad (5)$$

[7] The cation exchange membrane according to [5] or [6], wherein the first interval between the reinforcing core materials satisfying the relationship represented by the following expression (6) and the second interval between the reinforcing core materials satisfying the relationship represented by the following expression (7) are alternately present.

$$n=2, b > a/3 \quad (6)$$

$$n=2, c > a/3 \quad (7)$$

[8] The cation exchange membrane according to any one of [5] to [7], wherein the first interval between the reinforcing core materials satisfying the relationship represented by the following expression (8) and the second interval between the reinforcing core materials satisfying the relationship represented by the following expression (9) are alternately present.

$$n=2, 0.2a/3 \leq c \leq 0.9a/3, a/3 < b \leq 1.8a/3 \quad (8)$$

$$n=2, 1.1a/3 \leq c \leq 0.8 \quad (9)$$

[9] The cation exchange membrane according to [1], wherein a, b, c, and n satisfying the relationship represented by the above expression (1) or the above expression (2) are at least present in a MD direction and in a TD direction of the cation exchange membrane.

[10] The cation exchange membrane according to [6], wherein the first interval between the reinforcing core materials satisfying the relationships represented by the expression (3) and the expression (4) or the second interval between the reinforcing core materials satisfying the relationship represented by the expression (5) is present in the MD direction and in the TD direction of the cation exchange membrane.

[11] A method for producing the cation exchange membrane, comprising the steps of:
weaving two or more reinforcing core materials, a sacrifice yarn soluble in an acid or an alkali, and a dummy yarn soluble in a predetermined solvent in which the reinforcing core materials and the sacrifice yarn are insoluble, to obtain a reinforcing material having the sacrifice yarn and the dummy yarn arranged between the reinforcing core materials adjacent to each other;
soaking the reinforcing material in the predetermined solvent to remove the dummy yarn from the reinforcing material;
stacking the reinforcing material from which the dummy yarn is removed and a fluorine-based polymer having an ion-exchange group or an ion-exchange group precursor which can be converted into the ion-exchange group by hydrolysis, to form a membrane body having the reinforcing material; and
soaking the sacrifice yarn in an acid or an alkali to remove the sacrifice yarn from the membrane body, thereby forming an elution hole in the membrane body.

[12] An electrolysis vessel at least comprising: an anode; a cathode; and the cation exchange membrane according to any one of [1] to [10] arranged between the anode and the cathode.

Advantageous Effects of the Invention

According to the present invention, it is possible to provide the cation exchange membrane having excellent mechanical strength against folding, etc. and capable of delivering stable electrolytic performance for a long time, and the method for producing the cation exchange membrane.

MODES FOR CARRYING OUT THE INVENTION

Figure 1:
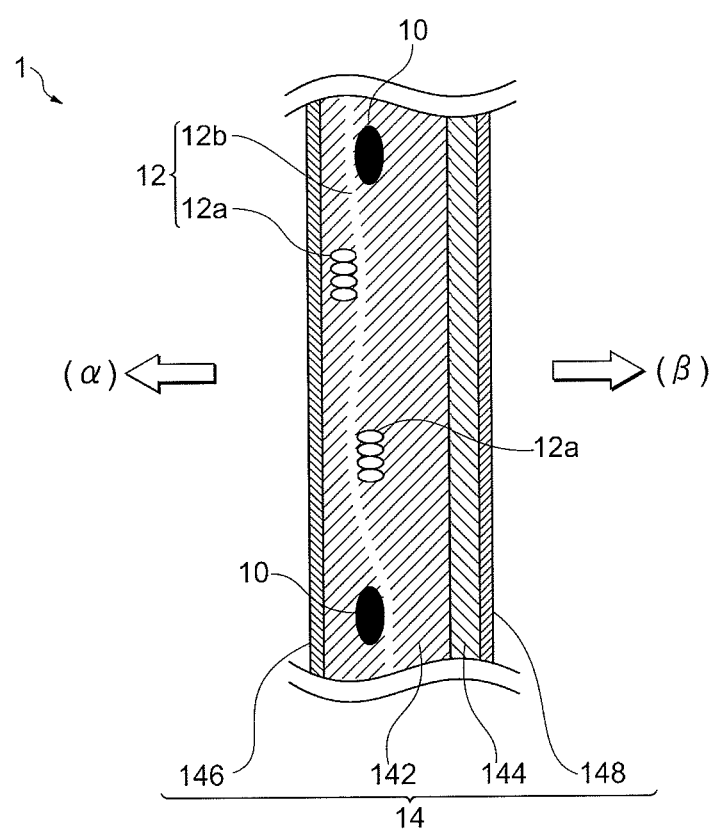
FIG. 1 shows a sectional side view of the first embodiment of the cation exchange membrane according to the present embodiment.

Hereinafter, the best mode for carrying out the present invention (hereinafter referred to as "the present embodiment") will be more specifically described. Note that, the present invention is not limited to the present embodiments below and can be modified in various ways within the scope thereof and carried out. Note that, in the drawings, the positional relationship such as right—left or up—down, is based on the positional relationship shown in the drawings unless otherwise specified. Furthermore, the dimensional ratio of a drawing is not limited to that shown in the drawing.
<Cation Exchange Membrane>

Figure 2:
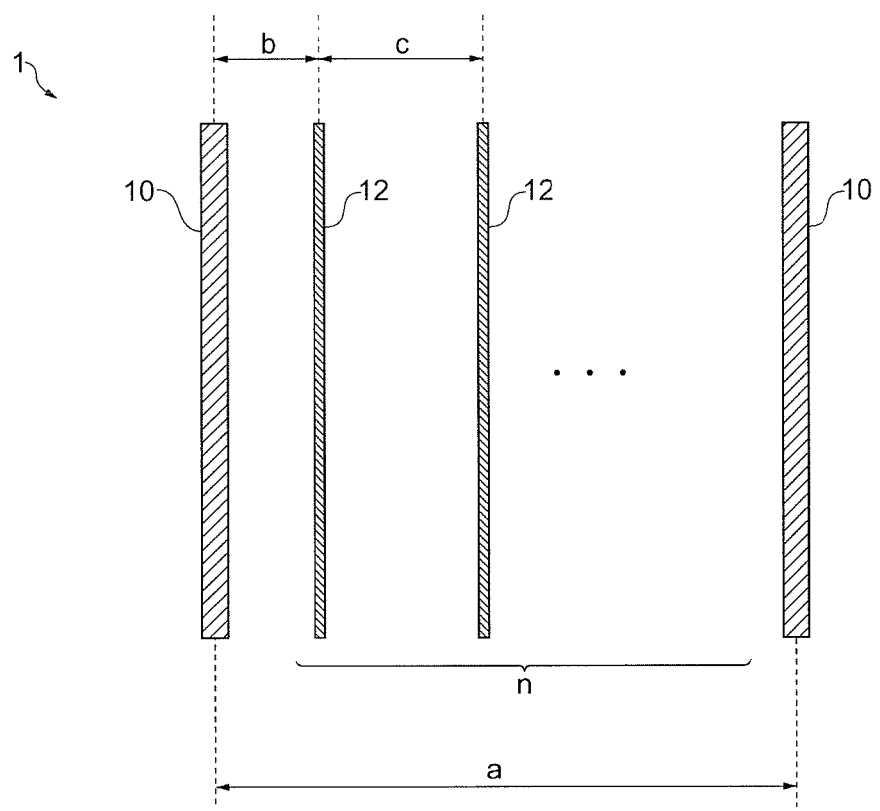
FIG. 2 shows a conceptual diagram of the first embodiment of the cation exchange membrane according to the present embodiment.

FIG. 1 is a sectional side view of a first embodiment of the cation exchange membrane according to the present embodiment. FIG. 2 is a conceptual diagram of a first embodiment of the cation exchange membrane according to the present embodiment. A cation exchange membrane 1 is a cation exchange membrane at least comprising: a membrane body 14 containing a fluorine-based polymer having an ion-exchange group; and two or more reinforcing core materials 10 arranged approximately in parallel within the membrane body 14. The membrane body 14 is provided with two or more elution holes 12 formed between the reinforcing core materials 10 adjacent to each other. In addition, assuming that a distance between the reinforcing core materials 10 adjacent to each other is represented by a, a distance between the reinforcing core materials 10 and the elution holes 12 adjacent to each other is represented by b, a distance between the elution holes 12 adjacent to each other is represented by c, and the number of the elution holes 12 formed between the reinforcing core materials 10 adjacent to each other is represented by n, then a, b, c, and n satisfying the relationship represented by the following expression (1) or expression (2) are at least present.

$$b > a/(n+1) \quad (1)$$

$$c > a/(n+1) \quad (2)$$

The membrane body 14 has a function of selectively passing a cation and contains a fluorine-based polymer. The membrane body 14 preferably has at least a sulfonic acid layer 142 having a sulfonic acid group as the ion-exchange group and a carboxylic acid layer 144 having a carboxylic acid group as the ion-exchange group. Generally, the cation exchange membrane 1 is used such that the sulfonic acid layer 142 is positioned on the anode side (α) of the electrolysis vessel and the carboxylic acid layer 144 is positioned on the cathode side (β) of the electrolysis vessel. The sulfonic acid layer 142 is formed of a low electrical-resistance material and preferably has a large film thickness in view of membrane strength. The carboxylic acid layer 144 preferably has a high anion elimination property even if the film thickness is low. By containing the carboxylic acid layer 144 as mentioned above, selective permeability of a cation such as a sodium ion can be further improved. The membrane body 14 is satisfactory as long as it has a function of selectively passing the cation and contains a fluorine-based polymer, and the structure thereof is not necessarily limited to the aforementioned structure. The term "anion elimination property" used herein refers to a property of preventing invasion or permeation of an anion into the cation exchange membrane.

The fluorine-based polymer used in the membrane body 14 may include a fluorine-based polymer having an ion-exchange group or an ion-exchange group precursor which can be converted into an ion-exchange group by hydrolysis, formed of a fluorinated hydrocarbon as a main chain with a functional group capable of converting into an ion-exchange group by e.g., hydrolysis as a pendant side chain and to which melt processing is applicable. An example of the method for producing such the fluorine-based polymer will be described below.

The fluorine-based polymer can be produced by, for example, copolymerization of at least one monomer selected from the following first group and at least one monomer selected from the following second group and/or the following third group, or alternatively produced by homopolymerization of one monomer selected from any one of the following first group, second group and third group.

The first group monomer may include, for example, a vinyl fluoride compound. Examples of the vinyl fluoride compound may include vinyl fluoride, tetrafluoroethylene, hexafluoropropylene, vinylidene fluoride, trifluoroethylene, chlorotrifluoroethylene and perfluoro(alkylvinylether). Particularly, in the case where the cation exchange membrane 1 according to the present embodiment is used as a membrane for alkali electrolysis, a perfluoro monomer is preferably used as the vinyl fluoride compound. For example, a perfluoro monomer selected from the group consisting of tetrafluoroethylene, hexafluoropropylene and perfluoro(alkylvinylether) is preferable.

The second group monomer may include, for example, a vinyl compound having a functional group capable of converting into a carboxylic acid group (carboxylic acid type ion-exchange group). The vinyl compound having a functional group capable of converting into a carboxylic acid group (carboxylic acid type ion-exchange group) may include, for example, a monomer represented by $CF_2=CF(OCF_2CYF)_s—O(CZF)_t—COOR$ (wherein s represents an integer of 0 to 2, t represents an integer of 1 to 12, Y and Z each independently represent F or $CF_3$ and R represents a lower alkyl group) and the like.

Of these, a compound represented by $CF_2=CF(OCF_2CYF)_n—O(CF_2)_m—COOR$ is preferable, where n represents an integer of 0 to 2, m represents an integer of 1 to 4, Y represents F or $CF_3$ and R represents $CH_3$, $C_2H_5$ or $C_3H_7$. Particularly, when the cation exchange membrane according to the present embodiment is used as a cation exchange membrane for alkali electrolysis, at least a perfluoro compound is preferably used as a monomer. However, since the alkyl group (see the aforementioned R) of the ester group is removed from the polymer at the time of hydrolysis, the alkyl group (R) may not be a perfluoroalkyl group where all hydrogen atoms are substituted with fluorine atoms. Of these, for example, the monomers shown below are more preferable;

$CF_2=CFOCF_2CF(CF_3)OCF_2COOCH_3$, $CF_2=CFOCF_2CF(CF_3)O(CF_2)_2COOCH_3$, $CF_2=CF[OCF_2CF(CF_3)]_2O(CF_2)_2COOCH_3$, $CF_2=CFOCF_2CF(CF_3)O(CF_3)_3COOCH_3$, $CF_2=CFO(CF_2)_2COOCH_3$, $CF_2=CFO(CF_2)_3COOCH_3$.

The third group monomer may include, for example, a vinyl compound having a functional group capable of converting into a sulfonic acid group (sulfone type ion-exchange group). As the vinyl compound having a functional group capable of converting into a sulfonic acid group (sulfone type ion-exchange group), for example, a monomer represented by $CF_2=CFO-X-CF_2-SO_2F$ is preferable (wherein X represents a perfluoro group). Specific examples thereof may include the monomers shown below:

$CF_2=CFOCF_2CF_2SO_2F$, $CF_2=CFOCF_2CF(CF_3)OCF_2CF_2SO_2F$, $CF_2=CFOCF_2CF(CF_3)OCF_2CF_2CF_2SO_2F$, $CF_2=CF(CF_2)_2SO_2F$, $CF_2=CFO[CF_2CF(CF_3)O]_2CF_2CF_2SO_2F$, $CF_2=CFOCF_2CF(CF_2OCF_3)OCF_2CF_2SO_2F$.

Of these, $CF_2=CFOCF_2CF(CF_3)OCF_2CF_2CF_2SO_2F$, and $CF_2=CFOCF_2CF(CF_3)OCF_2CF_2SO_2F$ are more preferable.

From these monomers, copolymers can be produced by a polymerization method developed for homo-polymerization and copolymerization of ethylene fluoride, particularly, a general polymerization method used for tetrafluoroethylene. For example, in a non-aqueous method, a polymerization reaction can be carried out using an inert solvent such as perfluorohydrocarbon and chlorofluorocarbon in the presence of a radical polymerization initiator such as a perfluorocarbon peroxide and an azo compound under the conditions: a temperature of 0 to 200° C. and a pressure of 0.1 to 20 MPa.

In the above-mentioned copolymerization, the kind of combination of the above-mentioned monomers and the ratio thereof are not particularly limited, and selected and determined depending upon the type and amount of functional group that is desired to be added to the fluorine-based polymer to be obtained. For example, in order to obtain a fluorine-based polymer containing only a carboxylate functional group, at least one kind of monomer may be selected each from the aforementioned first group and second group and copolymerized. Furthermore, in order to obtain a polymer containing only a sulfonyl fluoride functional group, at least one kind of monomer may be selected each from the aforementioned first group and third group and copolymerized. Moreover, in order to obtain a fluorine-based polymer having a carboxylate functional group and a sulfonyl fluoride functional group, at least one kind of monomer may be selected each from the aforementioned first group, second group and third group and copolymerized. In this case, a desired fluorine-based polymer may be obtainable also by separately polymerizing a copolymer formed of monomers selected from the aforementioned first group and second group and a copolymer formed of monomers selected from the aforementioned first group and third group and thereafter mixing them. Furthermore, the mixing ratio of the monomers is not particularly limited; however, in order to increase the amount of functional group per unit polymer, the ratio of monomers selected from the aforementioned second group and third group may be increased.

The total ion exchange capacity of a fluorine containing copolymer is not particularly limited; however, it is preferably from 0.5 to 2.0 mg equivalent/g in terms of a dry resin and more preferably from 0.6 to 1.5 mg equivalent/g in terms of a dry resin. The total ion exchange capacity used herein refers to an equivalent of an exchange group per unit weight of a dry resin and can be determined by neutralization titration, etc.

The cation exchange membrane 1 of the present embodiment preferably further has coating layers 146, 148, if necessary, in view of preventing deposition of gas on the cathode-side surface and the anode-side surface. The material for constituting the coating layers 146, 148 is not particularly limited; however, in view of preventing deposition of a gas, an inorganic substance is preferably included. Examples of the inorganic substance may include zirconium oxide and titanium oxide. A method for forming the coating layers 146, 148, is not particularly limited and a method known in the art can be used. For example, a method of coating a liquid having inorganic oxide fine particles dispersed in a binder polymer solution by a spray, etc., can be mentioned.

The cation exchange membrane 1 has two or more reinforcing core materials 10 arranged approximately in parallel within the membrane body 14. The reinforcing core material 10 refers to a member for improving mechanical strength of the cation exchange membrane 1 and dimensional stability thereof. The dimensional stability as used herein refers to a property of suppressing the expansion and contraction of the cation exchange membrane within a desired range. The cation exchange membrane having excellent dimensional stability does not expand and contract more than necessary by e.g., hydrolysis and electrolysis and has stable dimensions for a long time. The member for constituting the reinforcing core material 10 may be, but not particularly limited to, for example, a reinforcing core material formed from a reinforcing yarn. The reinforcing yarn used herein is a member for constituting the reinforcing core material and refers to a yarn capable of imparting desired mechanical strength to the cation exchange membrane and being stably present in the cation exchange membrane.

The form of the reinforcing core material 10 is not particularly limited; however, for example, a woven fabric, a nonwoven fabric and a knitted fabric using the aforementioned reinforcing yarn may be used. Of these, in view of convenience in production, a woven fabric is preferable. As a weave of the woven fabric, a plain weave is preferable. The thickness of the woven fabric is not particularly limited; however, it is preferably from 30 to 250 μm and more preferably from 30 to 150 μm. Furthermore, the weave density (the number of woven fibers per unit length) of the reinforcing yarn is not particularly limited; however, it is preferably from 5 to 50 yarns/inch.

The opening ratio of the reinforcing core material 10 is not particularly limited; however, it is preferably 30% or more and 90% or less. The opening ratio is preferably 30% or more in view of the electrochemical properties of the cation exchange membrane and preferably 90% or less in view of the mechanical strength of the membrane. More preferably, the opening ratio is 50% or more and further preferably 60% or more.

The opening ratio herein refers to a ratio of the (B) sum of areas through which a substance such as an ion can pass relative to the (A) sum of the surface areas of the cation exchange membrane and represented by (B)/(A). The (B) represents the sum of areas through which a cation and an electrolyte, etc. can pass without being interrupted by e.g., the reinforcing core material and the reinforcing yarn, etc. contained in the cation exchange membrane. A method for determining the opening ratio will be more specifically described. A surface image of the cation exchange membrane (cation exchange membrane before coating) is shot. The areas of the regions where no reinforcing core material is present are sum up to obtain the (B). Subsequently, from the area of the surface image of the cation exchange membrane, the (A) is obtained. The (B) is divided by the (A) to obtain the opening ratio.

The material for the reinforcing yarn constituting the reinforcing core material 10 is not particularly limited; however, it is preferably a material having resistance to an acid and an alkali, etc. Particularly, a material containing a fluorine-based polymer is more preferable in view of maintaining heat resistance and chemical resistance for a long time. Examples of the fluorine-based polymer referred to herein, may include a polytetrafluoroethylene (PTFE), a tetrafluoroethylene-perfluoroalkylvinyl ether copolymer (PFA), a ethylene-tetrafluoroethylene copolymer (ETFE), a tetrafluoroethylene-hexafluoropropylene copolymer, a trifluorochlorethylene-ethylene copolymer and a polyvinylidene fluoride (PVDF). Of these, polytetrafluoroethylene (PTFE) is preferable in view of heat resistance and chemical resistance.

The diameter of the reinforcing yarn to be used in the reinforcing core material 10 is not particularly limited; however, it is preferably from 20 to 300 deniers and more preferably from 50 to 250 deniers. The reinforcing yarn may be a monofilament or a multi-filament. Furthermore, a yarn thereof, a slit yarn, etc. can be used.

Particularly preferable form of the reinforcing core material 10 is a reinforcing core material containing PTFE in view of chemical resistance and heat resistance, and a tape yarn or a highly oriented monofilament in view of strength. Specifically, a tape yarn prepared by slicing a highly strong porous sheet formed of PTFE into tape-form pieces or a plain-weave using a highly oriented monofilament formed of PTFE of from 50 to 300 deniers with a weave density of from 10 to 50 yarns/inch is preferable and the reinforcing core material having a thickness within the range of from 50 to 100 μm is more preferable. Furthermore, the opening ratio of the cation exchange membrane containing the reinforcing core material is further preferably 60% or more.

In the membrane body 14, two or more elution holes 12 are formed. The elution holes 12 are holes that can be used as a flow channel of a cation generated in electrolysis and an electrolyte. By forming the elution holes 12, mobility of an alkali ion generated in electrolysis and an electrolyte can be ensured. The shape of the elution holes 12 is not particularly limited. In the case where the cation exchange membrane is produced in accordance with the process described later, the elution holes 12 of the membrane body are formed by dissolving a sacrifice yarn in an acid or an alkali, thus the shape of the elution holes 12 is same as the shape of the sacrifice yarn.

As shown in FIG. 1, the cation exchange membrane 1 has elution holes 12a formed in the perpendicular direction to the plane of paper and an elution hole 12b formed along the longitudinal direction in parallel to the plane of paper. That is, the elution hole 12b formed along the longitudinal direction in parallel to the plane of paper is formed approximately in perpendicular to the reinforcing core material 10. The elution hole 12b is preferably formed such that the elution hole 12b alternately passes through the anode side (side near the sulfonic acid layer 142) and the cathode side (side near the carboxylic acid layer 144) of the reinforcing core material 10. Owing to such a structure, in the portion where the elution hole 12b is formed on the cathode side of the reinforcing core material 10, a cation (for example, sodium ion) transported through the electrolyte charged in the elution hole can flow also on the cathode side of the reinforcing core material 10. As a result, since a cation flow is not interrupted, the electrical resistance of the cation exchange membrane 1 can be further reduced.

Note that, in FIG. 1, the cation exchange membrane 1 has elution holes 12a formed in the perpendicular direction to the plane of paper and the elution hole 12b formed along the longitudinal direction in parallel to the plane of paper. The number n of the elution holes 12 formed between the reinforcing core materials 10 adjacent to each other refers to the number of elution holes 12 arranged in the same direction. In the case of FIG. 1, the number of elution holes 12a formed in the perpendicular direction to the plane of paper is specified as the number n in the perpendicular direction to the plane of paper; whereas the number of elution holes 12b formed along the longitudinal direction in parallel to the plane of paper is specified as the number n along the longitudinal direction in parallel to the plane of paper.

As shown in FIG. 2, assuming that the distance between the reinforcing core materials 10 adjacent to each other is represented by a, the distance between the reinforcing core materials 10 and the elution holes 12 adjacent to each other is represented by b, the distance between the elution holes 12 adjacent to each other is represented by c, and the number of the elution holes 12 formed between the reinforcing core materials 10 adjacent to each other is represented by n, then a, b, c, and n satisfying the relationship represented by the following expression (1) or expression (2) are at least present.

$$b > a/(n+1) \tag{1}$$

$$c > a/(n+1) \tag{2}$$

In the expressions, $a/(n+1)$ corresponds to the distance between elution holes when they are arranged at equal intervals between the reinforcing core materials 10. In the interval between the reinforcing core materials 10 where a, b, c and n satisfying the relationship represented by expression (1) are present, the distance b between the reinforcing core materials 10 and the elution holes 12 adjacent to each other is larger than the equal intervals ($a/(n+1)$). In this case, as the distance b between the reinforcing core materials 10 and the elution holes 12 adjacent to each other, there are two distances between the adjacent reinforcing core materials 10, that is, there are two b (more specifically, in FIG. 2, one is present between the reinforcing core material 10 on the left and the elution hole 12 and the other is present between the reinforcing core material 10 on the right and the elution hole 12). In the present embodiment, it is satisfactory if at least one of the two b satisfies the relationship of expression (1). More preferably, the two b present between the adjacent reinforcing core materials 10 both satisfy the relationship of expression (1). Note that, a is the sum of all b and all c present between the reinforcing core materials adjacent to each other, although it is apparent from the definition.

In the interval between the reinforcing core materials 10 where a, b, c and n satisfying the relationship represented by expression (2) are present, the interval c between the elution holes 12 adjacent to each other is larger than the equal intervals (a/(n+1)). In this case, as the distance c between the elution holes 12 adjacent to each other, there are two or more distances c, if n=3 or more. That is, there are two or more c. In this case, it is satisfactory if at least one of c satisfies the relationship of expression (2) in the present embodiment.

As is apparent from the description above, in the cation exchange membrane 1 of the present embodiment, it is satisfactory if at least one arrangement satisfying the relationship of expression (1) or expression (2).

Furthermore, the elution holes 12 are preferably arranged at positions approximately symmetric to the middle of the adjacent reinforcing core materials. At this time, the two b present between the adjacent reinforcing core materials become a approximately equal value.

If the reinforcing core materials 10 and the elution holes 12 are formed in the membrane body 14 so as to satisfy the relationship of expression (1) or expression (2), at least the mechanical strength of the cation exchange membrane 1 can be improved. By setting positional relationship between the reinforcing core materials 10 and the elution holes 12 to a specific positional relationship represented by expression (1) or expression (2), even if the case where the cation exchange membrane 1 may be fold in handing, a failure such as formation of a pinhole caused by application of excessive load to a specific site can be prevented. As a result, the folding resistance of the cation exchange membrane 1 can be excessively improved; excellent mechanical strength can be maintained for a long time; and a stable electrolytic performance can be delivered. In the present embodiment, as long as either one of expression (1) and expression (2) is satisfied, the aforementioned effect can be obtained, however in view of mechanical strength, the relationship of expression (2) is more preferably satisfied.

In addition, electrolysis voltage can be further reduced by satisfying expression (1) or expression (2). Electrolysis voltage can be reduced by controlling the arrangement of the elution holes 12 to ensure mobility of a cation such as an alkali ion generated in electrolysis and an electrolyte. A method for controlling the arrangement of the elution holes 12 may include, for example, a method of appropriately modifying weaving conditions in a step of producing a cation exchange membrane, as described later.

Furthermore, when the cation exchange membrane 1 is installed within the electrolysis vessel, even if the cation exchange membrane 1 is rubbed against the electrode, etc. by e.g., vibration of the electrolysis vessel, it is possible to prevent the reinforcing core material 10 from damaging and sticking out through the surface of the membrane body 14. Since the reinforcing core material 10, etc. is embedded in the interior portion of the membrane body, the reinforcing core material 10 would not damage or stick out through the surface of the membrane body. Particularly, e.g., local peel off of the reinforcing core material 10 can be effectively prevented. In this manner, the cation exchange membrane 1 having a long life can be obtained.

In one aspect of the present embodiments, a, c and n preferably further satisfy the relationship of the following expression (3) in addition to the relationship of expression (1) or expression (2).

$$0.2a/(n+1) \leq c \leq 0.9a/(n+1) \qquad (3)$$

By satisfying the relationship of expression (3), the mechanical strength of the cation exchange membrane 1 can be further improved. In addition, the effect of reducing electrolysis voltage can be further improved.

It is more preferable that a, c and n further satisfy the relationship of expression (3-1) in addition to the relationship of expression (1) or expression (2) and further preferable that a, c and n further satisfy the relationship of expression (3-2).

$$0.4a/(n+1) \leq c \leq 0.8a/(n+1) \qquad (3\text{-}1)$$

$$0.4a/(n+1) \leq c \leq 0.75a/(n+1) \qquad (3\text{-}2)$$

Furthermore, when the relationship of expression (3) is satisfied, a, b and n preferably further satisfy the relationship of the following expression (4)

$$a/(n+1) < b \leq 1.8a/(n+1) \qquad (4)$$

By further satisfying the relationship of expression (4) in addition to expression (3), the mechanical strength of the cation exchange membrane 1 can be further improved. In addition, electrolysis voltage can be further reduced.

In addition to expression (3), a, b and n more preferably satisfy the relationship of expression (4-1) and further preferably satisfy the relationship of expression (4-2).

$$1.05a/(n+1) \leq b \leq 1.6a/(n+1) \qquad (4\text{-}1)$$

$$1.1a/(n+1) \leq b \leq 1.5a/(n+1) \qquad (4\text{-}2)$$

Note that, in the interval between the reinforcing core materials satisfying the relationships of expression (3) and expression (4), the interval b between the elution holes and the reinforcing core materials adjacent to each other is broad and the interval c between the elution holes is narrow. That is, needless to say, expression (1) is satisfied between the reinforcing core materials.

In addition, as the distance b between the reinforcing core materials 10 and the elution holes 12 adjacent to each other, there are two distances between the adjacent reinforcing core materials 10 (more specifically, in FIG. 2, one is present between the left end reinforcing core material 10 and the elution holes 12 and the other is present between the right end reinforcing core material 10 and the elution holes 12). Of the two b, at least one b may satisfy the relationship of expression (4). More preferably, both two b present between the adjacent reinforcing core materials 10 satisfy the relationship of expression (4).

In another embodiment, a, c and n preferably further satisfy the relationship of the following expression (5) in addition to the relationship of expression (1) or expression (2).

$$1.1a/(n+1) \leq c \leq 0.8a \qquad (5)$$

By satisfying the relationship of expression (5), the mechanical strength of the cation exchange membrane 1 can be further improved. By satisfying the relationship of expression (5), reduction of the tensile elongation of the cation exchange membrane 1 due to folding, etc. can be further suppressed to further reduce electrolysis voltage.

More preferably, a, c and n satisfy the relationship of expression (5-1) in addition to the relationship of expression (1) or expression (2), and further preferably satisfy the relationship of expression (5-2).

$$1.1a/(n+1) \leq c \leq 1.8a/(n+1) \quad (5\text{-}1)$$

$$1.1a/(n+1) \leq c \leq 1.7a/(n+1) \quad (5\text{-}2)$$

In the expressions, taking the case where n=2 as an example, the relationship of the aforementioned expressions will be described. When n=2, the number of elution holes between the reinforcing core materials is 2 and intervals are a/(n+1)=a/3 when elution holes are arranged at equal intervals. Therefore, when n=2, expression (1) and expression (2) become respectively the following expression (6) and expression (7).

$$n=2, b>a/3 \quad (6)$$

$$n=2, c>a/3 \quad (7)$$

Then, the intervals between the reinforcing core materials satisfying the relationship of expression (6) preferably further satisfy the relationship of expression (3). When the relationship of expression (3) is also satisfied in addition to expression (6), the interval between elution holes becomes narrow and the interval between the reinforcing core material and the elution hole becomes wide. In this manner, mechanical strength improves and electrolysis voltage can be reduced. More preferably, expression (4) is also satisfied in addition to expression (1).

Furthermore, the intervals between the reinforcing core materials satisfying the relationship of expression (7) preferably further satisfy the relationship of expression (5). When the relationship of expression (5) is satisfied in addition to expression (7), the interval between elution holes becomes wide and the each interval between the reinforcing core material and the elution hole becomes narrow. In this manner, mechanical strength improves and electrolysis voltage can be reduced.

More preferably, the first interval between the reinforcing core materials satisfying the relationships of expression (6) and expression (3) and the second interval between the reinforcing core materials satisfying the relationships of expression (7) and expression (5) are arranged alternately and repeatedly. In this arrangement, mechanical strength is further improved and electrolysis voltage can be reduced.

The cation exchange membrane according to the present embodiment is satisfactory as long as the relationship of expression (1) or expression (2) is satisfied in a predetermined direction of the membrane. More specifically, it is satisfactory as long as the relationship of expression (1) or expression (2) is satisfied in the direction of at least either one of the MD direction and the TD direction of the cation exchange membrane. At least in the TD direction (TD yarn described later) of the cation exchange membrane, it is preferable to satisfy the relationship of expression (1) or expression (2), and more preferably both in the MD direction and in the TD direction of the cation exchange membrane, the relationship of expression (1) or expression (2) is satisfied.

Then, in the direction of at least either one of the MD direction and the TD direction, it is preferable to have the intervals between the reinforcing core materials satisfying the relationships of expression (3) and (4) in addition to the relationship of expression (1) or expression (2); more preferable to have the intervals between the reinforcing core materials further satisfying the relationship of expression (3) at least in the TD direction (TD yarn) of the cation exchange membrane; and further preferable to have the intervals between the reinforcing core materials further satisfying the relationship of expression (3) both in the MD direction and in the TD direction of the cation exchange membrane.

Furthermore, in the direction of at least either one of the MD direction and the TD direction, it is preferable to have the intervals between the reinforcing core materials satisfying the relationship of expression (5), in addition to expression (1) or expression (2); more preferable to have the intervals between the reinforcing core materials further satisfying the relationship of expression (5) at least in the TD direction (TD yarn) of the cation exchange membrane; and further preferable to have the intervals between the reinforcing core materials further satisfying the relationship of expression (5) both in the MD direction and in the TD direction of the cation exchange membrane.

The MD direction (machine direction) used herein refers to the direction along which the membrane body and various core materials (for example, a reinforcing material obtained in the case where the reinforcing material is woven by using a reinforcing core material, a reinforcing yarn, a sacrifice yarn, a dummy yarn, etc.) are transported ("feed direction") in the process for producing the cation exchange membrane as described later. Furthermore, the MD yarn refers to a yarn woven (knitted) along the MD direction. The TD direction (transverse direction) refers to the direction in generally perpendicular to the MD direction. Furthermore, the TD yarn refers to a yarn woven (knitted) along the TD direction. If not only the relationship of expression (1) or expression (2) but also expression (3) or expression (5) etc., is satisfied in two directions, i.e., the MD direction and the TD direction of the cation exchange membrane, mechanical strength of the cation exchange membrane can be further improved and electrolysis voltage can be further reduced.

Figure 3:
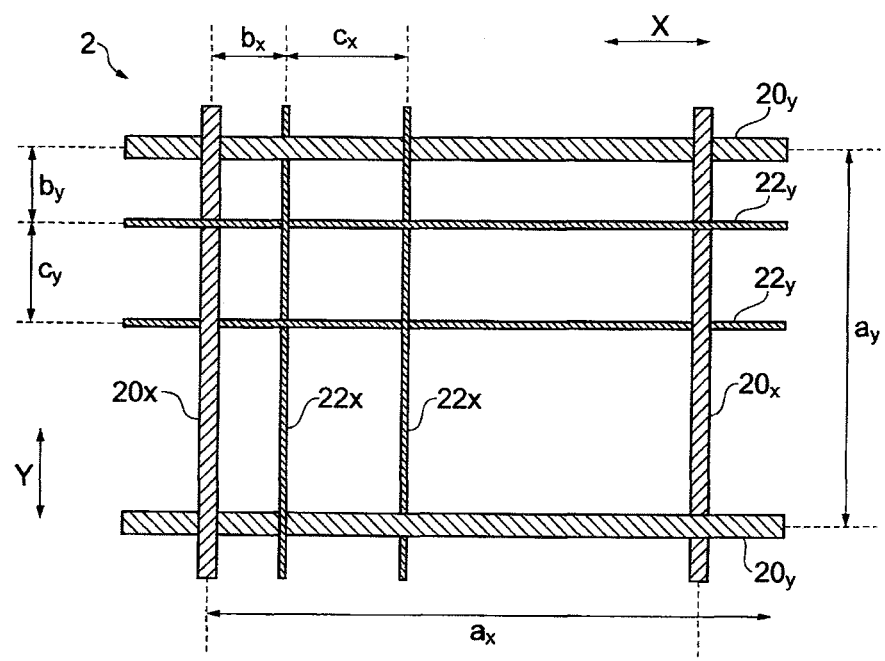
FIG. 3 shows a conceptual diagram of the second embodiment of the cation exchange membrane according to the present embodiment.

FIG. 3 is a conceptual diagram of the second embodiment of the cation exchange membrane according to the present embodiment. A cation exchange membrane 2 satisfies the relationship of expression (1) or expression (2) both in the MD direction and in the TD direction. More specifically, the cation exchange membrane 2 at least has two or more reinforcing core materials 20x arranged within the membrane body in the MD direction (see X) of the membrane body (not shown) and two or more elution holes 22x are formed between the reinforcing core materials 20x adjacent to each other. Assuming that the distance between the reinforcing core materials 20x adjacent to each other is represented by $a_x$, the distance between the reinforcing core materials 20x and the elution holes 22x adjacent to each other is represented by $b_x$, the distance between the elution holes 12 adjacent to each other is represented by $c_x$, and the number of the elution holes 22x formed between the reinforcing core materials 20x adjacent to each other is represented by $n_x$, then the relationship represented by the following expression (1x) or expression (2x) is satisfied.

$$b_x > a_x/(n_x+1) \quad (1x)$$

$$c_x > a_x/(n_x+1) \quad (2x)$$

Furthermore, the cation exchange membrane 2 has at least two or more reinforcing core materials 20y arranged within the membrane body in the TD direction (see Y) of the membrane body (not shown) and two or more elution holes 22y are formed between the reinforcing core materials 20y adjacent to each other. Assuming that the distance between the reinforcing core materials 20y adjacent to each other is represented by $a_y$, the distance between the reinforcing core materials 20y and the elution holes 22y adjacent to each other is represented by $b_y$, the distance between the adjacent elution holes 12 is represented by $c_y$, and the number of the elution holes 22y formed between the adjacent reinforcing core materials 20y is represented by $n_y$, then the relationship represented by the following expression (1y) or expression (2y) is satisfied.

$$b_y > a_y/(n_y+1) \tag{1y}$$

$$c_y > a_y/(n_y+1) \tag{2y}$$

In the present embodiment, it is not necessary that all reinforcing core materials and elution holes in the cation exchange membrane are formed so as to satisfy the aforementioned specific relationship (for example, expression (1) or expression (2), or expression (3) or expression (5) or the like). For example, if the cation exchange membrane has at least one interval between the reinforcing core materials having elution holes arranged so as to satisfy the relationship of expression (1) or expression (2), folding resistance of the cation exchange membrane is improved.

Furthermore, assuming that the region partitioned by adjacent two reinforcing core materials in the MD direction of the cation exchange membrane and adjacent two reinforcing core materials in the TD direction thereof is specified as one region, the ratio of the area of regions satisfying the relationship of expression (1) or expression (2) relative to the area of all regions in the cation exchange membrane is not particularly limited; however, it is preferably from 80 to 100% and more preferably from 90 to 100%. The edge periphery of the cation exchange membrane is to be immobilized in the electrolysis vessel while using and used as a site sandwiched by e.g., flanges of the electrolysis vessel. If the area ratio is 80% or more, in a portion corresponding to a current-carrying portion, formation of e.g., pinholes and cracks by folding can be prevented. For this reason, the area ratio of 80% or more is preferable. In addition, if the area ratio is 80% or more, in the portion corresponding to a current-carrying portion, an effect of reducing electrolysis voltage can be obtained. For this reason, the area ratio of 80% or more is preferable.

Furthermore, when the relationship of expression (3) or expression (5) is satisfied, the area ratio of regions satisfying the relationship of expression (3) or expression (5) is not particularly limited; however, it is preferably from 40 to 100% relative to the area of all regions in the cation exchange membrane and more preferably from 45 to 100%. In the region satisfying the relationship of expression (3) or expression (5), folding resistance tends to be further superior, compared to the region also satisfying expression (1) or expression (2). Therefore, if the area ratio is 40% or more, sufficiently high folding resistance can be obtained.

Figure 4:
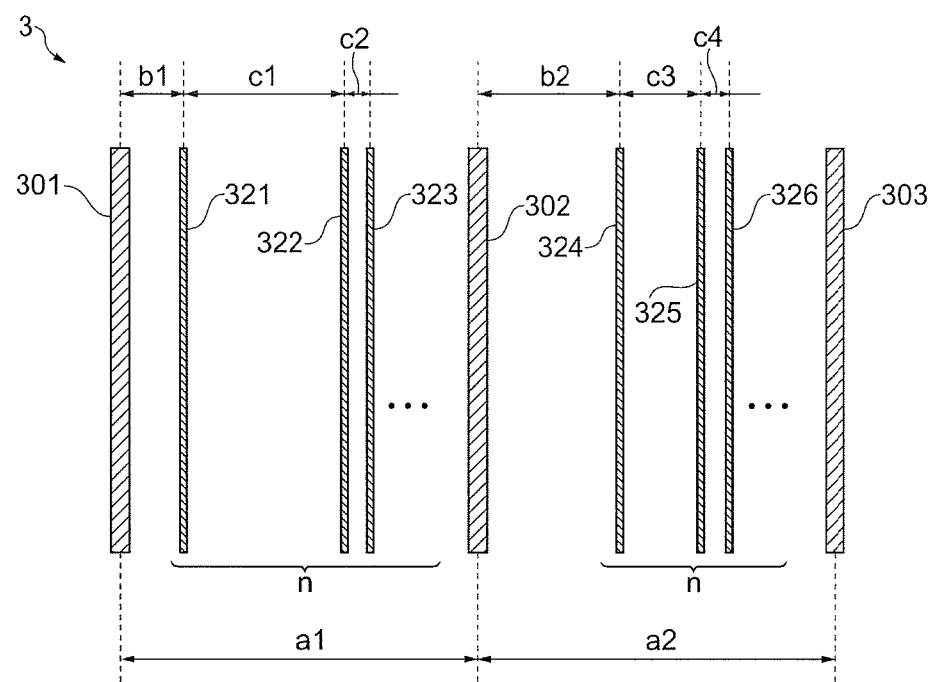
FIG. 4 shows a conceptual diagram of the third embodiment of the cation exchange membrane according to the present embodiment.

FIG. 4 is a conceptual diagram of the third embodiment of the cation exchange membrane according to the present embodiment. A cation exchange membrane 3 is a cation exchange membrane at least having a membrane body (not shown) containing a fluorine-based polymer having an ion-exchange group and two or more reinforcing core materials 301, 302, 303 arranged approximately in parallel within the membrane body, and 2 sets or more n number of elution holes 321, 322, 323, . . . , 324, 325, 326, . . . are formed between the reinforcing core materials adjacent to each other.

In the case of FIG. 4, the interval between the reinforcing core materials separated by the reinforcing core materials 301 and 302 and the interval between the reinforcing core materials separated by the reinforcing core materials 302 and 303 are arranged alternately and repeatedly. More specifically, in the interval between the reinforcing core materials separated by the reinforcing core materials 301 and 302, the elution holes 321, 322, 323 are formed at the distance $c_1, c_2, \ldots$ (hereinafter sometimes collectively referred to as c). Of these, at least $c_1$ satisfies the relationship of expression (2): $c_1 > a_1/(n+1)$. In contrast, in the interval between the reinforcing core materials separated by the reinforcing core materials 302 and 303, the interval $b_2$ between the reinforcing core materials and the elution holes adjacent to each other at least satisfies the relationship of expression (1): $b_2 > a_1/(n+1)$.

As described above, in the cation exchange membrane, it is preferable that the first interval between the reinforcing core materials (the interval separated by the reinforcing core material 302 and the reinforcing core material 303) satisfying the relationship of expression (1) and the second interval between the reinforcing core materials (the interval separated by the reinforcing core material 301 and the reinforcing core material 302) satisfying the relationship of expression (2) alternately appear. Owing to this arrangement, mechanical strength of the cation exchange membrane 3 can be further improved in the direction and electrolysis voltage thereof can be further reduced.

Note that, in the present embodiment, the direction along which the first region and the second region above are alternately arranged in the cation exchange membrane is not particularly limited; however, in at least either the MD direction or the TD direction of the cation exchange membrane, the first interval between the reinforcing core materials satisfying the relationship of expression (1) and the second interval between the reinforcing core materials satisfying the relationship of expression (2) are alternately arranged. The cation exchange membrane having such arrangement is preferable. More preferably, the cation exchange membrane has the first interval between the reinforcing core materials satisfying the relationship of expression (1) and the second interval between the reinforcing core materials satisfying the relationship of expression (2), which are alternately and repeatedly arranged along the MD direction (TD yarn arrangement direction) of the cation exchange membrane. Further preferably, the cation exchange membrane has the first interval between the reinforcing core materials satisfying the relationship of expression (1) and the second interval between the reinforcing core materials satisfying the relationship of expression (2), which are alternately and repeatedly arranged along the MD direction and the TD direction.

Generally, the cation exchange membrane has a rectangular shape. In most cases, its longitudinal direction corresponds to the MD direction and its transverse direction corresponds to the TD direction. Such the cation exchange membrane is wound around a tubular body like a vinyl chloride tube to transport at the time of shipment and during a lead time until installation into an electrolysis vessel. When the membrane is wound around the tubular body, the cation exchange membrane is sometimes folded in the TD direction to reduce the length of the tubular body. Even in such the case, concentration of load in the TD direction can be efficiently avoided as long as the cation exchange membrane contained as mentioned above is used, and thus formation of a pinhole, etc., can be effectively prevented.

As one aspect of the present embodiments, the cation exchange membrane preferably has the first interval between the reinforcing core materials satisfying the relationship of expression (1), which further satisfies the relationships of expressions (3) and (4) and the second interval between the reinforcing core materials satisfying the relationship of expression (2), which further satisfies the relationship of expression (5). Owing to this arrangement, mechanical strength can be further improved and electrolysis voltage can be further reduced. Note that, even in this case, the direction along which the first region and the second region above are alternately arranged in the cation exchange membrane is not particularly limited.

Furthermore, as another embodiment, the ion exchange membrane preferably has the first interval between the reinforcing core materials satisfying the relationship of expression (1) which further satisfies the relationship of expression (6) and the second interval between the reinforcing core materials satisfying the relationship of expression (2) which further satisfies the relationship of expression (7). Owing to this arrangement, mechanical strength can be further improved and electrolysis voltage can be further reduced. Note that, even in this case, the direction along which the first region and the second region above are alternately arranged in the cation exchange membrane is not particularly limited.

Figure 5:
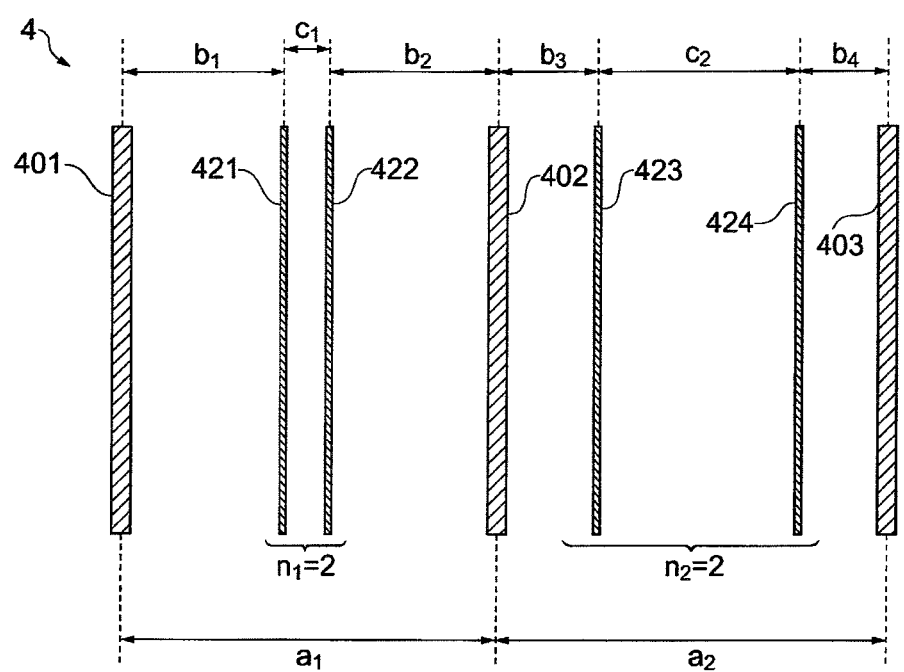
FIG. 5 shows a conceptual diagram of the fourth embodiment of the cation exchange membrane according to the present embodiment.

FIG. 5 is a conceptual diagram of the fourth embodiment of the cation exchange membrane according to the present embodiment. A cation exchange membrane 4 is a cation exchange membrane at least having a membrane body (not shown) containing a fluorine-based polymer having an ion-exchange group and two or more reinforcing core materials 401, 402, 403 arranged approximately in parallel within the membrane body, in which, in at least either one of the directions, i.e., in the MD direction or in the TD direction, of the cation exchange membrane 4, the interval between the reinforcing core materials satisfying the relationship of the following expression (6) and the interval between the reinforcing core materials satisfying the relationship of the following expression (7) are alternately present.

$$n=2, b>a/3 \qquad (6)$$

$$n=2, c>a/3 \qquad (7)$$

Such an arrangement is preferable because mechanical strength can be further improved and electrolysis voltage can be further reduced by the arrangement.

In FIG. 5, in the interval separated by the reinforcing core material 401 and the reinforcing core material 402, the distance $b_1$ between the reinforcing core material 401 and the elution hole 421 and the distance $b_2$ between the reinforcing core material 402 and the elution hole 422 both satisfy the relationship of the above expression (6): $b_1$ ($b_2$)>a/3. Furthermore, the distance $c_1$ between two elution holes 421 and 422 satisfies the relationship: $c_1<a_1/3$. In other words, in the interval separated by the reinforcing core material 401 and the reinforcing core material 402, the distance $c_1$ between two elution holes 421 and 422 is narrow compared to the distance between them in which they are arranged at an equal interval.

Note that, in the expression (6), it is satisfactory if at least either one of $b_1$ or $b_2$ satisfies the relationship of b>a/3, however in view of mechanical strength and convenience in production, it is more preferable that $b_1$ and $b_2$ both satisfy the relationship: b>a/3.

In the interval separated by the reinforcing core material 402 and the reinforcing core material 403, the distance $b_3$ between the reinforcing core material 402 and the elution hole 423 and the distance $b_4$ between the reinforcing core material 403 and the elution hole 434 both satisfy the relationship: b<$a_2$/3. Furthermore, the distance $c_2$ between two elution holes 423 and 424 satisfies the relationship of the expression (7): $c_2>a_2/3$. In other words, in the interval separated by the reinforcing core material 402 and the reinforcing core material 403, the distance $c_2$ between two elution holes 423 and 424 is wide compared to the distance between them in which they are arranged at an equal interval.

Note that, if the relationship of expression (7) above is satisfied, at least either one of $b_3$ or $b_4$ may satisfy the relationship: b<a/3; however, it is preferable that, in view of mechanical strength and convenience in production, $b_3$ and $b_4$ both satisfy the relationship: b<a/3.

In at least either one of the directions, i.e., the MD direction or the TD direction of the cation exchange membrane 4, it is more preferable that the interval between reinforcing core materials satisfying the relationship of the following expression (8) and the interval between reinforcing core materials satisfying the relationship of the following expression (9) are alternately present. In this case, in FIG. 5, distances $a_1$, $b_1$, $b_2$, and $c_1$ satisfy the relationship of the following expression (8); and distances $a_2$, $b_3$, $b_4$, and $c_2$ satisfy the relationship of the following expression (9).

$$n=2, 0.2a/3 \leq c \leq 0.9a/3, a/3 < b \leq 1.8a/3 \qquad (8)$$

$$n=2, 1.1a/3 \leq c \leq 0.8 \qquad (9)$$

Owing to this arrangement, mechanical strength can be further improved and electrolysis voltage can be further reduced.

Figure 6:
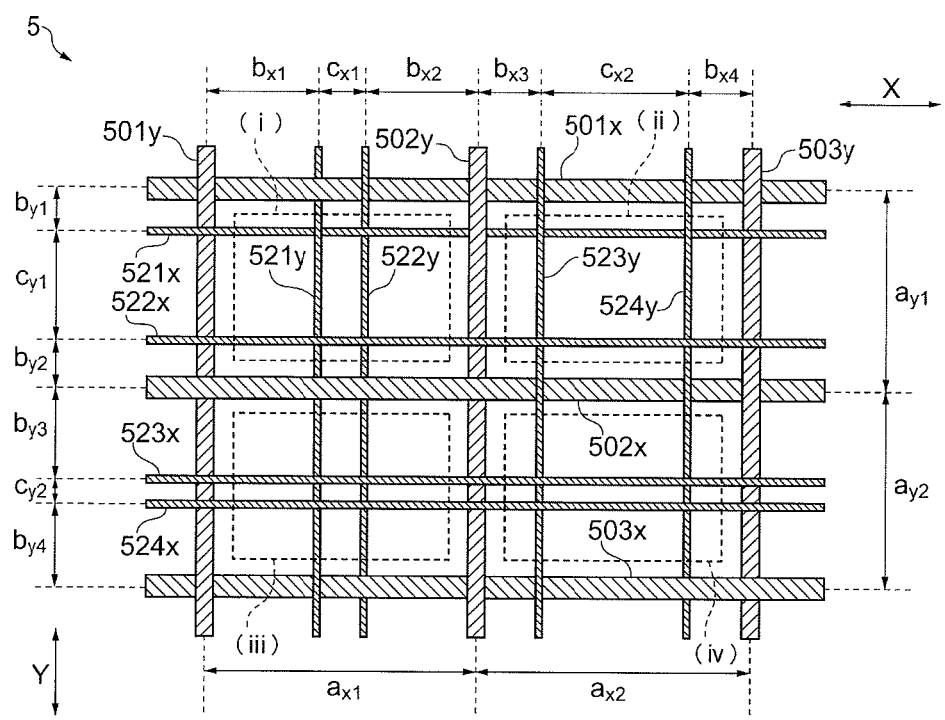
FIG. 6 shows a conceptual diagram of the fifth embodiment of the cation exchange membrane according to the present embodiment.

FIG. 6 is a conceptual diagram of the fifth embodiment of the cation exchange membrane according to the present embodiment. In a cation exchange membrane 5, 4 regions are formed, which are partitioned by reinforcing core materials 501x, 502x, 503x arranged along the MD direction (see X) and reinforcing core materials 501y, 502y, 503y arranged along the TD direction (see Y). Furthermore, elution holes 521x, 522x, 523x, 524x are formed along the MD direction of the cation exchange membrane 5 and elution holes 521y, 522y, 523y, 524y are formed along the TD direction. Moreover, the cation exchange membrane 5 has a structure having a region where the intervals between elution holes are less densely arranged and a region where the intervals between elution holes are densely arranged are alternately arranged in both the MD direction and in the TD direction.

The cation exchange membrane 5 has (i) a first region surrounded by the reinforcing core materials 501x, 502x in the MD direction and the reinforcing core materials 501y, 502y in the TD direction, (ii) a second region surrounded by the reinforcing core materials 502x, 503x in the MD direction and the reinforcing core materials 501y, 502y in the TD direction; (iii) a third region surrounded by the reinforcing core materials 502x, 503x in the MD direction and the reinforcing core materials 501y, 502y in the TD direction and (iv) a fourth region surrounded by the reinforcing core materials 502x, 503x in the MD direction and the reinforcing core materials 502y, 503y in the TD direction. These regions are repeatedly arranged.

In the first region, the elution holes 521x, 522x are arranged in the MD direction so as to satisfy the relationship of expression (6) and the elution holes 521y, 522y are arranged in the TD direction so as to satisfy the relationship of expression (7). Since mechanical strength can be further improved and electrolysis voltage can be further reduced, the elution holes 521x, 522x are preferably arranged in the MD direction so as to satisfy the relationship of expression (8). Owing to this arrangement, mechanical strength of the cation exchange membrane can be further improved and electrolysis voltage thereof can be further reduced. Similarly, the elution holes 521y, 522y are preferably arranged in the TD direction so as to satisfy the relationship of expression (9).

In the second region, the elution holes 523x, 524x are arranged in the MD direction so as to satisfy the relationship of expression (7) and the elution holes 521y, 522y are arranged in the TD direction so as to satisfy the relationship of expression (7). In the MD direction, the elution holes 523x, 524x are preferably arranged so as to satisfy the relationship of expression (9). Owing to this arrangement, mechanical strength of the cation exchange membrane can be further improved and electrolysis voltage thereof can be further reduced. Similarly, the elution holes 521y, 522y are preferably arranged in the TD direction so as to satisfy the relationship of expression (9).

In the third region, the elution holes 521x, 522x are arranged in the MD direction so as to satisfy the relationship of expression (6) and the elution holes 523y, 524y are arranged in the TD direction so as to satisfy the relationship of expression (6). In the MD direction, the elution holes 521x, 522x are preferably arranged so as to satisfy the relationship of expression (8). Owing to this arrangement, mechanical strength of the cation exchange membrane can be further improved and electrolysis voltage thereof can be further reduced. Similarly, the elution holes 523y, 524y are preferably arranged in the TD direction so as to satisfy the relationship of expression (8).

In the fourth region, the elution holes 523x, 524x are arranged in the MD direction so as to satisfy the relationship of expression (7) and the elution holes 523y, 524y are arranged in the TD direction so as to satisfy the relationship of expression (6). In the MD direction, the elution holes 523x, 524x are preferably arranged so as to satisfy the relationship of expression (9). Owing to this arrangement, mechanical strength of the cation exchange membrane can be further improved and electrolysis voltage thereof can be further reduced. Similarly, the elution holes 523y, 524y are preferably arranged in the TD direction so as to satisfy the relationship of expression (8).

Owing to the aforementioned structure, balance of arrangement of the reinforcing core materials and the elution holes in the cation exchange membrane can be further improved, with the result that the dimensional stability can be further improved.

<Producing Method>

A method for producing a cation exchange membrane according to the present embodiment, comprising the steps of:

weaving two or more reinforcing core materials, a sacrifice yarn soluble in an acid or an alkali, and a dummy yarn having a property of dissolving in a predetermined solvent in which the reinforcing core materials and the sacrifice yarn are insoluble, to obtain a reinforcing material having the sacrifice yarn and the dummy yarn arranged between the reinforcing core materials adjacent to each other;

soaking the reinforcing material in the predetermined solvent to remove the dummy yarn from the reinforcing material;

stacking the reinforcing material from which the dummy yarn is removed and a fluorine-based polymer having an ion-exchange group or an ion-exchange group precursor which can be converted into the ion-exchange group by hydrolysis, to form a membrane body having the reinforcing material; and soaking the sacrifice yarn in an acid or an alkali to remove the sacrifice yarn from the membrane body, thereby forming an elution hole in the membrane body.

One of the characteristics of the present embodiment resides in that the intervals of the elution holes formed between the reinforcing core materials adjacent to each other (see, for example, FIG. 2 b, c) are not equally separated. In order to easily and efficiently realize such the structure, a dummy yarn can be used. This will be more specifically described with reference to FIG. 7.

Figure 7:
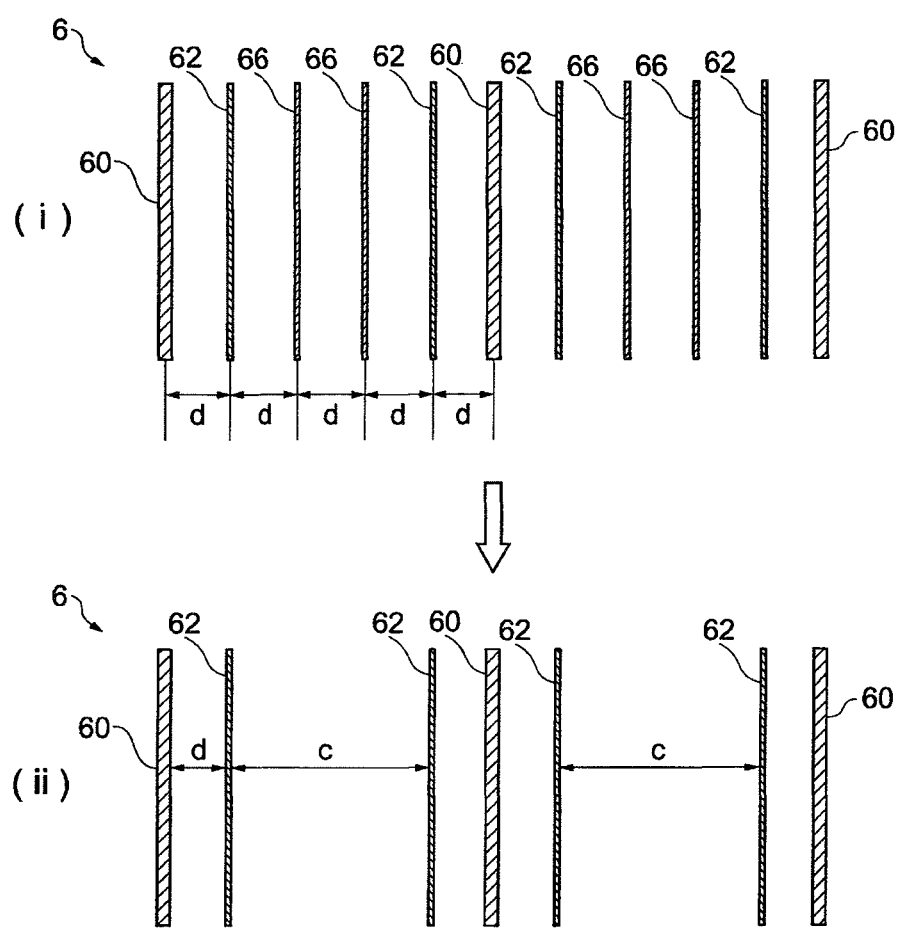
FIG. 7 shows a conceptual diagram for illustrating an example of the producing method according to the present embodiment.

FIG. 7 is a conceptual diagram for illustrating a producing method according to the present embodiment. First, between two or more reinforcing core materials 60, sacrifice yarns 62 for forming elution holes and dummy yarns 66 are woven to obtain a reinforcing material 6 (see FIG. 7, (i)). The reinforcing material 6 can be obtained as a so-called woven fabric and a knitted fabric etc. Note that, in view of productivity, a woven fabric is preferable. In this case, between the reinforcing core materials 60, the sacrifice yarns 62 and the dummy yarns 66 are preferably woven so as to be arranged at approximately equal intervals (interval d). By weaving the sacrifice yarns 62 and the dummy yarns 66 at approximately equal intervals, no complicated control is required to arrange the sacrifice yarns 62 at the intervals which satisfy relational expression of expression (1) and expression (2), etc., and an operation for weaving yarns can be simply performed with a satisfactory production efficiency. Note that, the dummy yarn 66 has a high solubility to a predetermined solvent.

Then, the reinforcing material 6 is soaked in a predetermined solvent to selectively dissolve and remove the dummy yarn 66 alone (see FIG. 7 (ii)). Owing to this step, the site where the dummy yarns 66 have been woven becomes a vacant space and thus the interval is widened.

The type of the predetermined solvent for dissolving and removing the material for the dummy yarn 66 and dummy yarn 66 is not particularly limited; however, it is satisfactory if the solubility of the dummy yarn to the predetermined solvent is higher than that of the reinforcing core material 60 and the sacrifice yarn 62. Examples of the material for the dummy yarn 66 may include polyvinyl alcohol (PVA), rayon, polyethylene terephthalate (PET), cellulose and polyamide. Of these, polyvinyl alcohol is preferable in view of high solubility.

As the predetermined solvent, any solvent may be used as long as it does not dissolve a reinforcing core material and a sacrifice yarn but can dissolve a dummy yarn. Therefore, the amount, etc. of solvent required for dissolving the dummy yarn is not particularly limited; however, the kind and amount of solvent can be appropriately selected in consideration of the quality of the reinforcing core material, sacrifice yarn, dummy yarn to be used and producing conditions, etc. Examples of such a solvent may include an acid, an alkali and hot water. Examples of the acid may include hydrochloric acid, nitric acid and sulfuric acid. Examples of the alkali may include sodium hydroxide and potassium hydroxide. Of these, sodium hydroxide or hot water is preferable in view of high dissolution rate.

The thickness and shape, etc. of the dummy yarn 66 are not particularly limited; however, a yean formed of from 4 to 12 polyvinyl alcohol filaments having a thickness of from 20 to 50 deniers and a circular cross-section is preferable.

The sacrifice yarn 62 refers to a yarn capable of dissolving in an acid or an alkali to form an elution hole in the cation exchange membrane. In addition, the solubility of the sacrifice yarn 62 in a predetermined solvent in which the dummy yarn 66 dissolves is lower than that of the dummy yarn 66. Examples of the material for the sacrifice yarn 62 may include polyvinyl alcohol (PVA), rayon, polyethylene terephthalate (PET), cellulose and polyamide. Of these, polyethylene terephthalate (PET) is preferable in view of stability during a weaving step and solubility to an acid or an alkali.

The amount of the sacrifice yarn 62 contained in a fabric is preferably from 10 to 80 mass % based on the total amount of the reinforcing material and more preferably from 30 to 70 mass %. Furthermore, the sacrifice yarn has a thickness of from 20 to 50 deniers and preferably formed of a monofilament or multifilament.

The dummy yarn 66 can be woven such that it inserts between sacrifice yarns 62 and between the reinforcing core material 60 and the sacrifice yarn 62. Therefore, the intervals of the reinforcing core materials 60 and the sacrifice yarns 62 arranged in the reinforcing material 6 can be arbitrarily determined by appropriately selecting the thickness and shape of the dummy yarn and the manner and order of weaving the dummy yarn. Since the dummy yarn 66 is removed by a predetermined solvent before the reinforcing material 6 is layered on a fluorine-based polymer, the interval of the sacrifice yarns 62 to be arranged can be arbitrarily determined. In this manner, the reinforcing core material 60 and the sacrifice yarn 62 for forming an elution hole can be arranged so as to satisfy the relationship of expression (1) or expression (2).

Furthermore, as to the MD yarn, although not shown in the figure, the sacrifice yarn, etc. can be arranged at arbitrary intervals in the reinforcing material by a method of passing a bundle of two or more yarns selected from the reinforcing yarn, the sacrifice yarn and the dummy yarn through a single dent of the reed of the weaving machine or a method of providing a dent having no yarn between dents through which a reinforcing yarn, a sacrifice yarn, a dummy yarn, etc. are passed. For example, control in the MD direction can be made by varying types of yarns (reinforcing yarn, sacrifice yarn, etc.) used in combination passing through a single dent of the reed of a weaving machine. More specifically, a bundle of a reinforcing yarn and a sacrifice yarn is passed through a first dent, a bundle of a sacrifice yarn and a reinforcing yarn is passed through a second yarn, a sacrifice yarn and a sacrifice yarn are passed through a third bundle. In this case, the arrangement of a reinforcing yarn, a sacrifice yarn, a sacrifice yarn, a reinforcing yarn, a sacrifice yarn and a sacrifice yarn in this order can be repeatedly made. In this manner, the intervals of the sacrifice yarn arranged in a reinforcing material can be controlled.

Subsequently, the reinforcing material 6 from which a dummy yarn 66 is removed is layered on a fluorine-based polymer having an ion-exchange group to form a membrane body having the reinforcing material 6. A preferable method for forming the membrane body may include, for example, a method having the following (1) step and (2) step.

(1) A fluorine-based polymer layer (hereinafter referred to as a "first layer") containing a carboxylate functional group positioned on the cathode side and a fluorine-based polymer layer (hereinafter referred to as a "second layer") containing a sulfonyl fluoride functional group are coextruded to form a film. Subsequently, the reinforcing material and the second layer/first layer composite film are layered in this order on a flat-plate or a drum having a heat source and a vacuum source, and having micro pores in the surface, via a permeable heat resistant release paper. These films are integrated at the temperature under which individual polymers melt while removing air between the layers by reducing pressure.

(2) Separately from the second layer/first layer composite film, a fluorine-based polymer layer (hereinafter referred to as a "third layer") containing a sulfonyl fluoride functional group is singly formed into a film in advance. Subsequently, the third layer film, reinforcing material and second layer/first layer composite film are layered in this order on a flat-plate or a drum having a heat source and a vacuum source and having micro pores in the surface, via a permeable heat resistant release paper. These films are integrated at the temperature under which individual polymers melt while removing air between the layers by reducing pressure. Note that, in this case, the direction along which the extruded film is fed is the MD direction.

Coextruding the first layer and the second layer in the step (1) contributes to enhancing the adhesion strength of the interface. Furthermore, in the integration method under reduced pressure, compared to a pressurizing press method, the thickness of the third layer on the reinforcing material characteristically increases. Moreover, since the reinforcing material is immobilized within the cation exchange membrane, mechanical strength of the cation exchange membrane can be sufficiently maintained.

Note that, to further increase the durability of the cation exchange membrane, a layer (hereinafter referred to as a "fourth layer") containing both a carboxylate functional group and a sulfonyl fluoride functional group can be further interposed between the first layer and the second layer and a layer containing both a carboxylate functional group and a sulfonyl fluoride functional group can be used as the second layer. In this case, a method in which a polymer containing a carboxylate functional group and a polymer containing a sulfonyl fluoride functional group are separately produced and then mixed, and a method in which a monomer containing a carboxylate functional group and a monomer containing a sulfonyl fluoride functional group both are copolymerized and put in use may be used.

In the case where the fourth layer is used as a constitutional element of the cation exchange membrane, the first layer and the fourth layer may be formed into a coextrusion film, the second layer and the third layer may be separately and singly formed into films, and then these films may be layered in accordance with the aforementioned method. Furthermore, the three layers, i.e., first layer, fourth layer and second layer, may be simultaneously coextruded into a film. In this manner, a membrane body containing a fluorine-based polymer having an ion-exchange group can be formed on the reinforcing material.

Furthermore, the sacrifice yarn contained in the membrane body is removed by dissolving it in an acid or an alkali to form elution hole(s) in the membrane body. The sacrifice yarn has a solubility to an acid or an alkali and the sacrifice yarn is eluted in the cation exchange membrane producing step and under the electrolysis environment to form elution holes at the elution sites. In this manner, the cation exchange membrane having elution holes formed in the membrane body can be obtained. The elution holes are formed with positional relationship satisfying the aforementioned relational expression represented by expression (1) or expression (2).

Furthermore, the cation exchange membrane according to the present embodiment preferably has a protruding portion only consisting of polymer having an ion-exchange group on the sulfonic acid layer side (on the anode surface side, see FIG. 1). The protruding portion is preferably consisting of resin alone. The protruding portion can be formed by previously embossing the release paper which can be used in integrating the aforementioned composite film of the second layer and the first layer and the reinforcing material, etc.

Figure 10:
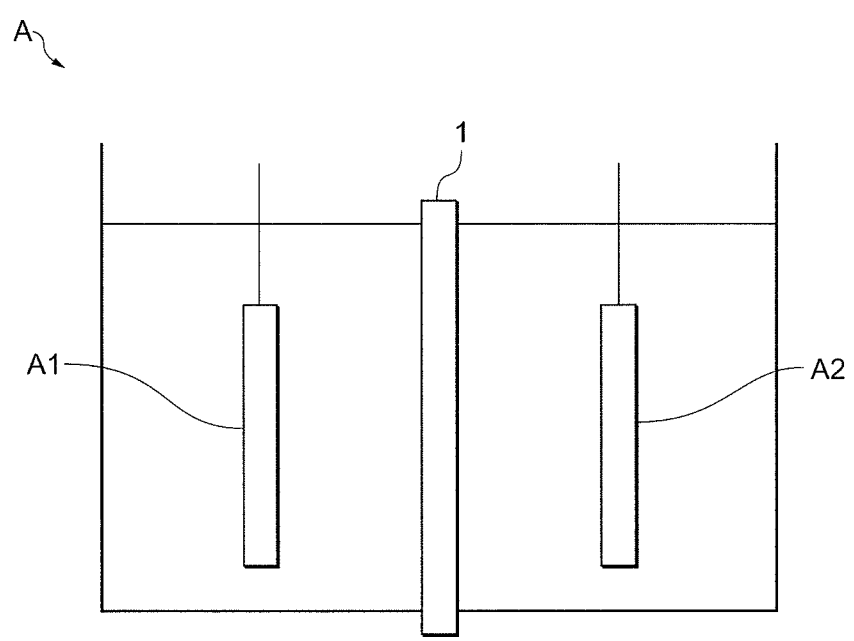
FIG. 10 shows a conceptual diagram of the electrolysis vessel according to the present embodiment.

The cation exchange membrane according to the present embodiment can be used in various electrolysis vessels. FIG. 10 is a conceptual diagram of the electrolysis vessel according to the present embodiment. An electrolysis vessel A at least has an anode A1, a cathode A2 and the cation exchange membrane 1 according to the present embodiment arranged between the anode A1 and the cathode A2. The electrolysis vessel A can be used for various types of electrolysis. Hereinbelow, as a typical example, the case where the cation exchange membrane is used in electrolysis for an aqueous alkali chloride solution will be described.

Electrolysis conditions are not particularly limited; however, electrolysis can be performed in conventionally known conditions. For example, a 2.5 to 5.5 N aqueous alkali chloride solution is supplied to an anode chamber, whereas water or a diluted aqueous alkali hydroxide solution is supplied to a cathode chamber. Electrolysis can be performed in the conditions: a temperature of from 50 to 120° C. and a current density of from 5 to 100 A/dm².

The constitution of the electrolysis vessel according to the present embodiment is not particularly limited; for example, a unipolar system or a multipolar system may be employed. The materials for constituting the electrolysis vessel are not particularly limited. For example, as a material for the anode chamber, alkali chloride and chlorine-resistant titanium are preferable. As a material for the cathode chamber, e.g., alkali hydroxide and hydrogen-resistant nickel are preferable. As the arrangement of electrodes, an appropriate interval may be provided between the cation exchange membrane and the anode. However if the anode is arranged in contact with the ion exchange membrane, this structure can be used without any problem. Furthermore, the cathode is generally arranged at an appropriate interval with the cation exchange membrane. However, a contact-type electrolysis vessel (zero-gap system electrolysis vessel) having no interval between them can be used without any problem.

In the cation exchange membrane according to the present embodiment, electrolysis voltage can be reduced by arranging membrane-constituting members within the membrane body so as to satisfy the aforementioned relational expressions. Particularly, compared to a conventional cation exchange membrane where elution holes for passing various substances such as a cation are arranged at equal intervals, resistance to a cation decreases by arranging elution holes at unequal intervals. As a result, electrolysis voltage may presumably decrease (note that, the function of the present embodiment is not limited to this).

Particularly, in the intervals between reinforcing core materials satisfying the relationship of aforementioned expression (2), elution holes are arranged near a reinforcing core material interrupting a cation. Owing to the arrangement, the region interrupting a cation reduces and the resistance to a cation further reduces. As a result, electrolysis voltage is further reduced (note that, the function of the present embodiment is not limited to this).

EXAMPLES

Hereinbelow, the present invention will be more specifically described by way of Examples. Note that, the present invention is not limited to the following Examples.
[Measurement of Distance]

Figure 8:
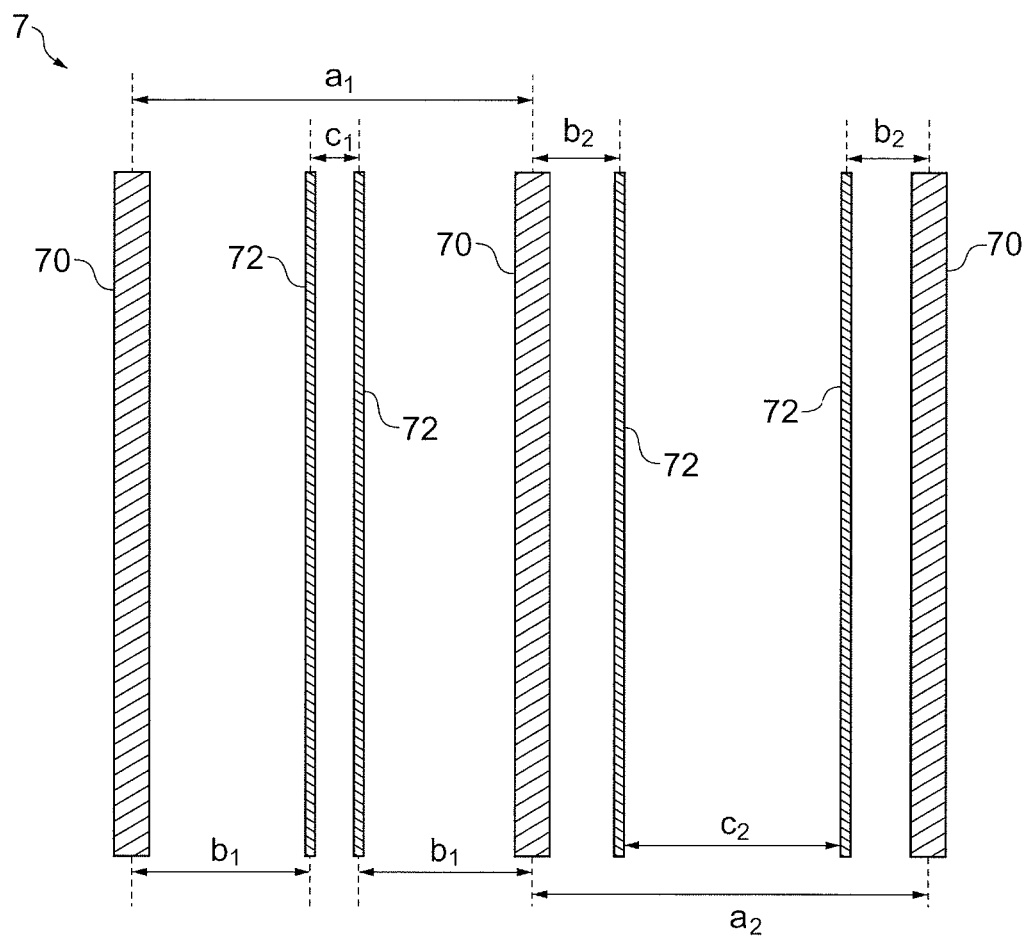
FIG. 8 shows a conceptual diagram of a cation exchange membrane prepared in Examples and Comparative Examples.
Figure 9:
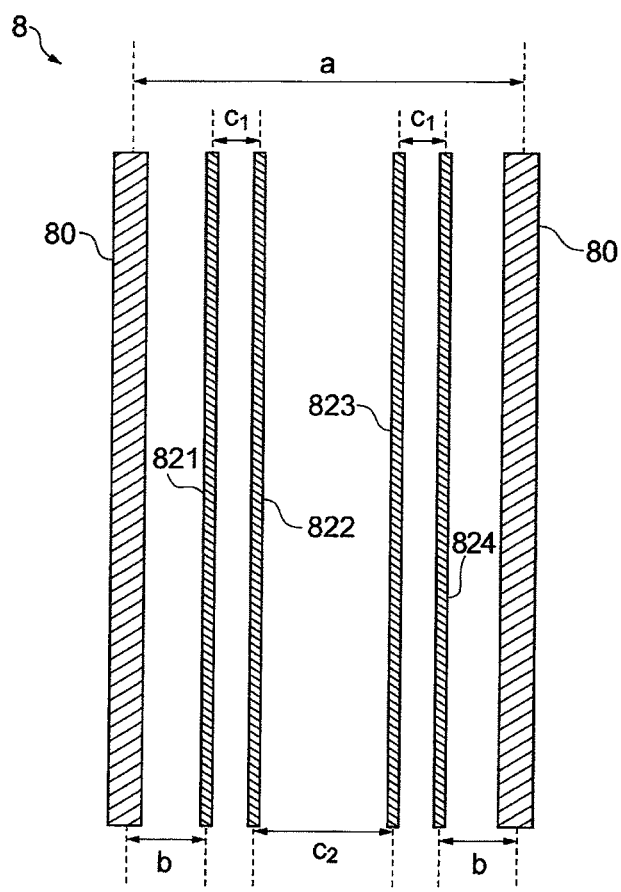
FIG. 9 shows a conceptual diagram of another cation exchange membrane prepared in Examples and Comparative Examples.

The distance a between the reinforcing core materials adjacent to each other, distance b ($b_1$, $b_2$) between the reinforcing core materials and elution holes adjacent to each other, and the distance c ($c_1$, $c_2$) between the elution holes adjacent to each other were measured by the following methods (see FIGS. 8 and 9).

In the case where the distance in the TD direction was measured, the cation exchange membrane was cut along the direction in perpendicular to the TD direction (i.e., the MD direction). The cut surface was a cross section of the cation exchange membrane in the TD direction. In the case where the distance in the MD direction was measured, the cation exchange membrane was cut along the direction in perpendicular to the MD direction (the TD direction). The cut surface was a cross section of the cation exchange membrane in the MD direction.

The cross section of the cation exchange membrane was magnified by a microscope and a, b and c in the TD direction and in the MD direction were measured. At this time, the distance was determined by measuring the distance between the center point of the reinforcing core material and the center point of the elution hole in the transverse direction. For example, a was determined by measuring the distance between the center point of the reinforcing core material and the center point of the other adjacent reinforcing core material in the transverse direction. Note that, a, b and c were measured 5 times and an average value of the 5 measurement values was used.
[Measurement of Folding Resistance]

Degree of reduction in strength (folding resistance) by folding the cation exchange membrane was evaluated by the following method. Note that, the folding resistance refers to the ratio of the tensile elongation (tensile elongation ratio) of the cation exchange membrane after folding relative to the tensile elongation of the cation exchange membrane before folding.

Tensile elongation was measured by the following method. A sample of 1 cm in width was cut along the direction having an angle of 45 degrees against the reinforcing yarn embedded in the cation exchange membrane. Subsequently, the tensile elongation of the sample was measured in the conditions: the distance between chucks: 50 mm, a tension rate: 100 mm/minute in accordance with JIS K6732.

The cation exchange membrane was folded by the following method. The cation exchange membrane was folded by applying weight of 400 g/cm² so as to allow the surface of the carboxylic acid layer side (see FIG. 1, the carboxylic acid layer 144, and "polymer A layer" described later) to face inside. In the MD-folding, the cation exchange membrane was folded so as to form a folding line in perpendicular to the MD yarn of the cation exchange membrane and evaluation was made (MD folding). In the TD folding, the cation exchange membrane was folded so as to form a folding line in perpendicular to the TD yarn of the cation exchange membrane and evaluation was made (TD folding). Therefore, in the MD folding, contribution of control of intervals between reinforcing core materials and elution holes arranged along the TD direction to folding resistance can be evaluated, whereas in the TD folding, contribution of control of intervals between reinforcing core materials and elution holes arranged along the MD direction to folding resistance can be evaluated.

After MD folding and TD folding were separately made, tensile elongation of the cation exchange membrane was measured to obtain a ratio of tensile elongation relative to that before folding. This ratio was employed as a folding resistance.
[Measurement of Electrolysis Voltage]

An electrolysis vessel was prepared using the cation exchange membrane and its electrolysis voltage was measured. The electrolysis voltage was measured in an electrolysis cell of a forced circulation type having a 1.5 mm-gap. As the cathode, an electrode formed by applying nickel oxide serving as a catalyst onto a nickel expanded metal was used. As the anode, an electrode formed by applying ruthenium, iridium and titanium serving as a catalyst onto a titanium expanded metal was used. In the electrolysis cell, the cation exchange membrane was arranged between the anode chamber and the cathode chamber.

To the anode side, an aqueous sodium chloride solution was supplied while controlling a concentration to be 205 g/L, whereas water was supplied while maintaining the caustic soda concentration on the cathode side at 32 wt %. Subsequently, electrolysis was performed for 7 days at a current density of 80 A/dm$^2$ and a temperature of 90° C., in the conditions that liquid pressure on the cathode side of the electrolysis vessel was set to be higher by 5.3 kPa than the liquid pressure of the anode side. Thereafter, the electrolysis voltage required was measured by a voltmeter.

Example 1

As a reinforcing core material, a monofilament of polytetrafluoroethylene (PTFE) of 90 deniers (hereinafter referred to as a "PTFE yarn") was used. As a sacrifice yarn, a yarn of 6-filament polyethylene terephthalate (PET) of 40 deniers twisted at a rate of 200 times/m (hereinafter referred to as a "PET yarn") was used. As a dummy yarn, a yarn of 15-filament polyvinyl alcohol (PVA) of 36 deniers twisted at a rate of 200 times/m (hereinafter referred to as a "PVA yarn") was used.

First, PTFE yarns were arranged at a rate of 24 yarns/inch at approximately equal intervals. MD yarns were prepared by use of a continuous 3-dent reed as follows. A bundle of 2 yarns consisting of PTFE yarn and PET yarn was passed through a first reed; a bundle of 2 yarns consisting of PET yarn and PTFE yarn was passed through a second reed; and a bundle of 2 yarns consisting of PET yarn and PET yarn was passed through a third reed. The bundles of yarns in this combination were sequentially and repeatedly passed through the reed in this order. As to TD yarns, PTFE yarn, PET yarn, PVA yarn, PVA yarn, PET yarn, PTFE yarn, PVA yarn, PVA yarn, PET yarn, PET yarn, PVA yarn and PVA yarn were arranged in this order repeatedly and at approximately equal intervals to obtain a plain weave. In this manner, a woven fabric (reinforcing material) was obtained. Subsequently, the obtained reinforcing material was subjected to contact bonding performed by a roll heated to 125° C. Thereafter, the reinforcing material was soaked in a 0.1 N aqueous sodium hydroxide solution to dissolve a dummy yarn (PVA yarn) alone and remove it from the reinforcing material. The thickness of the reinforcing material from which the dummy yarn was removed was 81 µm.

Next, dry-resin polymer A, which was a copolymer of tetrafluoroethylene ($CF_2=CF_2$) and $CF_2=CFOCF_2CF(CF_3)OCF_2CF_2COOCH_3$ and had a total ion exchange capacity of 0.85 mg equivalent/g, and a dry-resin polymer B, which was a copolymer of $CF_2=CF_2$ and $CF_2=CFOCF_2CF(CF_3)OCF_2CF_2SO_2F$ and had a total ion exchange capacity of 1.05 mg equivalent/g, were prepared. Using polymers A and B, two-layered film X, which consisted of a polymer A layer of 13 µm in thickness and a polymer B layer of 84 µm in thickness, was obtained in accordance with a coextrusion T-die method. Furthermore, film Y consisting of a polymer B of 20 µm in thickness was obtained by using a single layer T-die method.

Subsequently, release paper, film Y, a reinforcing material and film X were layered in this order on a drum housing a heat source and a vacuum source and having micro pores in the surface, and heated under reduced pressure. At this time, the processing temperature was 219° C. and a degree of pressure reduction was 0.022 MPa. Thereafter, the release paper was removed to obtain composite film. The obtained composite film was soaked in an aqueous solution containing 30 mass % of dimethyl sulfoxide (DMSO) and 15 mass % of potassium hydroxide (KOH) at 90° C. for 1 hour to perform hydrolysis, followed by washing with water and drying. In this manner, the sacrifice yarn (PET yarn) was dissolved to obtain a membrane body having elution holes formed therein.

Furthermore, to a 5 mass % ethanol solution of an acid-type polymer, polymer B, zirconium oxide having a primary particle size of 1 µm was added up to a faction of 20 mass %, and dispersed to prepare a suspension solution. The suspension solution was sprayed to both surfaces of the above composite film by a spray method and dried to form a coating layer (0.5 mg/cm$^2$) on the surfaces of the composite film. In this manner, the cation exchange membrane 7 as shown in FIG. 8 was obtained. The cation exchange membrane 7 of FIG. 8 had a membrane body (not shown) and two or more reinforcing core materials 70 arranged approximately in parallel within the membrane body. The membrane body had a structure where two elution holes 72 were formed between the reinforcing core materials 70 adjacent to each other. In the structure of Example 1, the intervals between reinforcing core materials having $a_1$, $b_1$, $c_1$ and the intervals between reinforcing core materials having $a_2$, $b_2$, $c_2$ repeatedly appear in the TD direction or in the MD direction. Note that, in other Examples and Comparative Examples described later, if the intervals between reinforcing core materials have only single a, b, c values in the TD direction or in the MD direction, these values will be hereinafter described as $a_1$, $b_1$, $c_1$.

In the obtained cation exchange membrane, in the TD direction, the distance $a_2$ between the reinforcing core materials adjacent to each other was 1112 µm, the number n of elution holes provided between the adjacent reinforcing core materials was 2 and the distance $c_2$ between the adjacent elution holes was 432 µm. According to calculation, distance $c_2$ was expressed by $1.17a_2/(n+1)$ (see FIG. 8, the same hereinafter).

Furthermore, in the TD direction, in the distance $a_1$ between the reinforcing core materials adjacent to each other of 1056 µm, the number n of elution holes provided between the adjacent reinforcing core materials was 2 and the distance $c_1$ of the adjacent elution holes was 203 µm. According to calculation, the distance $c_1$ was expressed by $0.58a_1/(n+1)$.

Moreover, in the MD direction, in the distance $a_2$ between the reinforcing core materials adjacent to each other of 1192 µm, the number n of elution holes provided between the adjacent reinforcing core materials was 2 and the distance $c_2$ of the adjacent elution holes was 528 µm. According to calculation, the distance $c_2$ was expressed by $1.33a_2/(n+1)$.

In the MD direction, in the distance $a_1$ between the reinforcing core materials adjacent to each other of 998 µm, the number n of elution holes provided between the adjacent reinforcing core materials was 2 and the distance $c_1$ of the adjacent elution holes was 296 µm. According to calculation, the distance $c_1$ was expressed by $0.89a_1/(n+1)$.

The physical properties of the obtained cation exchange membrane are shown in Table 1. In Table 1, the interval units between reinforcing core materials, which were alternately arranged in adjacent to each other in the TD direction of the cation exchange membrane in Example 1 were respectively designated as reinforcing core material interval T1 and reinforcing core material interval T2. Furthermore, In the MD direction, repeated constitutional units were designated as reinforcing core material interval M1 and reinforcing core material interval M2. Also as to the following Examples and Comparative Examples, description was made in the table similarly. As shown in Table 1, it was confirmed that the cation exchange membrane had a high tensile elongation retaining rate in either one of MD folding and TD folding.

Example 2

A cation exchange membrane was prepared by using the same materials as in Example 1 except that a yarn (PVA yarn) of 15-filament polyvinyl alcohol (PVA) of 28 deniers twisted 200 times/m was used as a dummy yarn.

In the obtained cation exchange membrane, in the TD direction, the distance $a_2$ between the reinforcing core materials adjacent to each other was 1005 μm, the number n of elution holes provided between the adjacent reinforcing core materials was 2 and the distance $c_2$ of the adjacent elution holes was 373 μm. According to calculation, the distance $c_2$ was expressed by $1.11a_2/(n+1)$ (see FIG. 8, the same hereinafter).

Furthermore, in the TD direction, in the distance $a_1$ between the reinforcing core materials adjacent to each other of 1091 μm, the number n of elution holes provided between the adjacent reinforcing core materials was 2 and the distance $c_1$ of the adjacent elution holes was 252 μm. According to calculation, the distance $c_1$ was expressed by $0.69a_1/(n+1)$.

Moreover, in the MD direction, in the distance $a_2$ between the reinforcing core materials adjacent to each other of 1199 μm, the number n of elution holes provided between the adjacent reinforcing core materials was 2 and the distance $c_2$ of the adjacent elution holes was 500 μm. According to calculation, the distance $c_2$ was expressed by $1.25a_2/(n+1)$.

In the MD direction, in the distance $a_1$ between the reinforcing core materials adjacent to each other of 999 μm, the number n of elution holes provided between the adjacent reinforcing core materials was 2 and the distance $c_1$ between the adjacent elution holes was 266 μm. According to calculation, the distance $c_1$ was expressed by $0.80a_1/(n+1)$.

The physical properties of the obtained cation exchange membrane are shown in Table 1. As shown in Table 1, it was confirmed that the cation exchange membrane had a high tensile elongation retaining rate in either one of MD folding and TD folding.

Example 3

First, PTFE yarns were arranged at a rate of 24 yarns/inch at approximately equal intervals. MD yarns were prepared by use of a continuous 3-dent reed as follows. A bundle of 2 yarns consisting of PTFE yarn and PET yarn was passed through a first reed; a bundle of 2 yarns consisting of PET yarn and PTFE yarn was passed through a second reed; and a bundle of 2 yarns consisting of PET yarn and PET yarn was passed through a third reed. Weaving of the bundles of yarns in this combination was repeated in this order to obtain a plain weave. As to TD yarns, PTFE yarn, PVA yarn, PVA yarn, PET yarn, PET yarn, PVA yarn and PVA yarn were arranged in this order repeatedly and at approximately equal intervals to obtain a plain weave. In this manner, a woven fabric (reinforcing material) was obtained. Subsequently, the obtained reinforcing material was subjected to contact bonding performed by a roll heated to 125° C. Thereafter, the reinforcing material was soaked in a 0.1 N aqueous sodium hydroxide solution to dissolve a dummy yarn (PVA yarn) alone and remove it from the reinforcing material. The thickness of the reinforcing material from which the dummy yarn was removed was 85 μm. A cation exchange membrane was prepared in the same manner as in Example 1 except the above.

In the obtained cation exchange membrane, in the TD direction, the distance $a_1$ between the reinforcing core materials adjacent to each other was 1119 μm, the number n of elution holes provided between the adjacent reinforcing core materials was 2 and the distance $c_1$ of the adjacent elution holes was 255 μm. According to calculation, the distance $c_1$ was expressed by $0.68a_1/(n+1)$ (see FIG. 8, the same hereinafter).

Furthermore, in the MD direction, the distance $a_2$ between the reinforcing core materials adjacent to each other was 1229 μm, the number n of elution holes provided between the adjacent reinforcing core materials was 2 and the distance $c_2$ of the adjacent elution holes was 569 μm. According to calculation, the distance $c_2$ was expressed by $1.39a_2/(n+1)$.

Moreover, in the MD direction, the distance $a_1$ between the reinforcing core materials adjacent to each other was 985 μm, the number n of elution holes provided between the adjacent reinforcing core materials was 2 and the distance $c_1$ of the adjacent elution holes was 323 μm. According to calculation, the distance $c_1$ was expressed by $0.98a_1/(n+1)$.

The physical properties of the obtained cation exchange membrane are shown in Table 1. As shown in Table 1, it was confirmed that the cation exchange membrane had a high tensile elongation retaining rate in either one of MD folding and TD folding.

Example 4

First, PTFE yarns were arranged at a rate of 24 yarns/inch at approximately equal intervals. MD yarns were prepared by use of a continuous 3-dent reed as follows. A bundle of 2 yarns consisting of PTFE yarn and PET yarn was passed through a first reed; a bundle of 2 yarns consisting of PET yarn and PTFE yarn was passed through a second reed and a bundle of 2 yarns consisting of PET yarn and PET yarn was passed through a third reed. Weaving of the bundles of yarns in this combination was repeated in this order to obtain a plain weave. As to TD yarns, PTFE yarn, PET yarn and PET yarn were arranged at approximately equal interval sequentially in this order repeatedly to obtain a plain weave. In this manner, a woven fabric (reinforcing material) was obtained. Subsequently, the obtained reinforcing material was subjected to contact bonding performed by a roll heated to 125° C. Thereafter, the obtained reinforcing material was soaked in a 0.1 N aqueous sodium hydroxide solution to dissolve a dummy yarn (PVA yarn) alone and remove it from the reinforcing material. The thickness of the reinforcing material from which the dummy yarn was removed was 76 μm. A cation exchange membrane was prepared in the same manner as in Example 1 except the above.

In the obtained cation exchange membrane, in the TD direction, the distance $a_1$ between the reinforcing core materials adjacent to each other was 1092 μm, the number n of elution holes provided between the adjacent reinforcing core materials was 2 and the distance $c_1$ between the adjacent elution holes was 364 μm. According to calculation, the distance $c_1$ was expressed by $1.00a_1/(n+1)$.

In the MD direction, the distance $a_2$ between the reinforcing core materials adjacent to each other was 1178 μm, the number n of elution holes provided between the adjacent reinforcing core materials was 2 and the distance $c_2$ of the adjacent elution holes was 509 μm. According to calculation, the distance $c_2$ was expressed by $1.30a_2/(n+1)$ (see FIG. 8, the same hereinafter).

In the MD direction, the distance $a_1$ between the reinforcing core materials adjacent to each other was 930 μm, the number n of elution holes provided between the adjacent reinforcing core materials was 2 and the distance $c_1$ between the adjacent elution holes was 253 μm. According to calculation, the distance $c_1$ was expressed by $0.82a_1/(n-1)$.

The physical properties of the obtained cation exchange membrane are shown in Table 1. As shown in Table 1, it was confirmed that the cation exchange membrane had a high tensile elongation retaining rate in TD folding.

Comparative Example 1

A cation exchange membrane was produced having elution holes formed at equal intervals both in the MD direction and in the TD direction. As a reinforcing core material, a monofilament made by polytetrafluoroethylene (PTFE) of 90 deniers (PTFE yarn) was used. As a sacrifice yarn, a yarn formed of 6-filament polyethylene terephthalate (PET) of 40 deniers and twisted at a rate of 200 twists/m (PET yarn) was used.

First, PTFE yarns were arranged at a rate of 24 yarns/inch at equal intervals. As to MD yarns, PTFE yarn, PET yarn and PET yarn . . . were arranged in this order repeatedly to obtain a plain weave. Also as to TD yarns, PTFE yarn, PET yarn and PET yarn . . . were arranged repeatedly to obtain a plain weave. In this manner, a woven fabric (reinforcing material) was obtained. Subsequently, the obtained reinforcing material was subjected to contact bonding performed by a roll heated and controlled so as to have a thickness of 86 μm. The cation exchange membrane was obtained in the same manner as in Example 1 except the above.

In the cation exchange membrane, in the TD direction, the distance $a_1$ between the reinforcing core materials adjacent to each other was 1058 μm, the number n of elution holes provided between the adjacent reinforcing core materials was 2 and the distance $c_1$ of the adjacent elution holes was 353 μm. According to calculation, the distance $c_1$ was expressed by $1.00a_1/(n+1)$ (see FIG. 8, the same hereinafter).

In the MD direction, the distance $a_1$ between the reinforcing core materials adjacent to each other was 1058 μm, the number n of elution holes provided between the adjacent reinforcing core materials was 2 and the distance $c_1$ between the adjacent elution holes was 353 μm. According to calculation, the distance $c_1$ was expressed by $1.00a_1/(n+1)$.

The physical properties of the cation exchange membranes of Examples 1 to 4 and Comparative Example 1 are shown in Table 1. Note that, the symbol "-" in the table indicates that no corresponding substance is present in Examples and Comparative Examples. As shown in Table 1, it was confirmed that the cation exchange membrane of each Example had a high tensile elongation retaining rate in either one of MD folding and TD folding.

TABLE 1

| | | | Example 1 | Example 2 | Example 3 | Example 4 | Comparative Example 1 |
|---|---|---|---|---|---|---|---|
| Reinforcing yarn | | Material | PTFE | PTFE | PTFE | PTFE | PTFE |
| | | Denier | 90 | 90 | 90 | 90 | 90 |
| | | Filament | mono | mono | mono | mono | mono |
| Sacrifice yarn | | Material | PET | PET | PET | PET | PET |
| | | Denier | 30 | 30 | 40 | 40 | 40 |
| | | Filament | 6 | 6 | 6 | 6 | 6 |
| | | Twisting times | 200 | 200 | 200 | 200 | 200 |
| Dummy yarn | | Material | PVA | PVA | PVA | — | — |
| | | Denier | 36 | 28 | 36 | — | — |
| | | Filament | 15 | 15 | 15 | — | — |
| | | Twisting times | 200 | 200 | 200 | — | — |
| Thickness of reinforcing material (μm) | | | 81 | 84 | 85 | 76 | 86 |
| | | n | 2 | 2 | 2 | 2 | 2 |
| Yarn interval (TD direction) | T1 | $a_1$ | 1056 | 1091 | 1119 | 1092 | 1058 |
| | | $b_1$ | 426.5 | 419.5 | 432 | 364 | 352.5 |
| | | $c_1$ | 203 | 252 | 255 | 364 | 353 |
| | | $b_1/(a_1/(n+1))$ | 1.21 | 1.15 | 1.16 | 1.00 | 1.00 |
| | | $c_1/(a_1/(n+1))$ | 0.58 | 0.69 | 0.68 | 1.00 | 1.00 |
| | T2 | $a_2$ | 1112 | 1005 | — | — | — |
| | | $b_2$ | 340 | 316 | — | — | — |
| | | $c_2$ | 432 | 373 | — | — | — |
| | | $c_2/(a_2/(n+1))$ | 1.17 | 1.11 | — | — | — |
| Yarn interval (MD direction) | M1 | $a_1$ | 998 | 999 | 985 | 930 | 1058 |
| | | $b_1$ | 351 | 366.5 | 331 | 338.5 | 352.5 |
| | | $c_1$ | 296 | 266 | 323 | 253 | 353 |
| | | $b_1/(a_1/(n+1))$ | 1.06 | 1.10 | 1.01 | 1.09 | 1.00 |
| | | $c_1/(a_1/(n+1))$ | 0.89 | 0.80 | 0.98 | 0.82 | 1.00 |
| | M2 | $a_2$ | 1192 | 1199 | 1229 | 1178 | — |
| | | $b_2$ | 332 | 349.5 | 330 | 334.5 | — |
| | | $c_2$ | 528 | 500 | 569 | 509 | — |
| | | $c_2/(a_2/(n+1))$ | 1.33 | 1.25 | 1.39 | 1.30 | — |
| Folding resistance (%) (Tensile elongation retention rate (%)) | | MD Folding | 63 | 51 | 58 | 42 | 41 |
| | | TD Folding | 72 | 76 | 70 | 82 | 41 |

Example 5

First, PTFE yarns were arranged at a rate of 24 yarns/inch at approximately equal intervals. MD yarns were prepared by use of a continuous 3-dent reed as follows. A bundle of 2 yarns consisting of PTFE yarn and PET yarn was passed through a first reed; a bundle of 2 yarns consisting of PET yarn and PTFE yarn was passed through a second reed; and a bundle of 2 yarns consisting of PET yarn and PET yarn was passed through a third reed. Weaving of the bundles of yarns in this combination was repeated in this order to obtain a plain weave. As to TD yarns, PTFE yarn, PET yarn, PVA yarn, PVA yarn, PVA yarn, PVA yarn and PET yarn were arranged in this order repeatedly and at approximately equal intervals to obtain a plain weave. In this manner, a woven fabric (reinforcing material) was obtained. Subsequently, the obtained reinforcing material was subjected to contact bonding performed by a roll heated to 125° C. Thereafter, the reinforcing material was soaked in a 0.1 N aqueous sodium hydroxide solution to dissolve a dummy yarn (PVA yarn) alone and remove it from the reinforcing material. The thickness of the reinforcing material from which the dummy yarn was removed was 85 μm. A cation exchange membrane was prepared in the same manner as in Example 1 except the above.

In the cation exchange membrane, in the TD direction, the distance $a_1$ between the reinforcing core materials adjacent to each other was 1040 μm, the number n of elution holes provided between the adjacent reinforcing core materials was 2 and the distance $c_1$ between the adjacent elution holes was 448 μm. Accordingly, the distance $c_1$ was expressed by $1.29a_1/(n+1)$ (see FIG. 8, the same hereinafter). In the TD direction of the cation exchange membrane of Example 5, the only the interval between reinforcing core materials having the aforementioned a1, b1, c1 values was arranged.

In the MD direction, the distance $a_2$ between the reinforcing core materials adjacent to each other was 1151 μm, the number n of elution holes provided between the adjacent reinforcing core materials was 2 and the distance $c_2$ between the adjacent elution holes was 478 μm. Accordingly, the distance $c_2$ was expressed by $1.25a_2/(n+1)$. In the MD direction, the distance $a_1$ between the reinforcing core materials adjacent to each other was 944 μm, the number n of elution holes provided between the adjacent reinforcing core materials was 2 and the distance $c_1$ of the adjacent elution holes was 269 μm. Accordingly, the distance $c_1$ was expressed by $0.85a_1/(n+1)$.

As evaluation of mechanical strength, the cation exchange membrane was folded by applying weight of 400 g/cm² so as to allow the surface of the carboxylic acid layer side (see FIG. 1, the carboxylic acid layer 144, and "polymer A layer" described above) to face inside and the presence or absence of e.g., pinhole formation was observed. In the obtained cation exchange membrane of Example 5, formation of a pinhole by folding was not confirmed.

In Examples 1 to 5 and Comparative Example 1, electrolysis was performed by use of the obtained cation exchange membrane and electrolysis voltage was measured. The results are shown in Table 2.

TABLE 2

|  | Example 1 | Example 2 | Example 3 | Example 4 | Example 5 | Comparative Example 1 |
|---|---|---|---|---|---|---|
| Electrolysis voltage (V) | 3.22 | 3.26 | 3.31 | 3.37 | 3.30 | 3.45 |

As shown in Table 2, when electrolysis was performed by using the cation exchange membrane of each Example, it was confirmed that electrolysis voltage was reduced compared to Comparative Example 1. Furthermore, when an electrolysis operation was performed for 7 days, electrolysis could be stably performed.

From the above, it was demonstrated that the cation exchange membrane of each Example was excellent in mechanical strength against folding, etc. As a result, it was demonstrated that stable electrolytic performance can be delivered for a long time. It was further demonstrated that, in the cation exchange membrane of each Example, electrolysis voltage can be reduced compared to the cation exchange membrane where elution holes were formed at equal intervals, and excellent electrolytic performance can be delivered.

Example 6

First, PTFE yarns were arranged at a rate of 24 yarns/inch at approximately equal intervals. MD yarns were prepared by use of a continuous 5-dent reed as follows. A bundle of 2 yarns consisting of PTFE yarn and PET yarn was passed through a first reed; a bundle of 2 yarns consisting of PET yarn and PET yarn was passed through a second reed; a bundle of 2 yarns consisting of PET yarn and PTFE yarn was passed through a third reed; a bundle of 2 yarns consisting of PET yarn and PET yarn was passed through a fourth reed; and a bundle of 2 yarns consisting of PET yarn and PET yarn was passed through a fifth reed. Weaving of the bundles of yarns in this combination was repeated in this order to obtain a plain weave. As to TD yarns, PTFE yarn, PET yarn, PET yarn, PVA yarn, PVA yarn, PET yarn and PET yarn were arranged in this order repeatedly and at approximately equal intervals to obtain a plain weave. In this manner, a woven fabric (reinforcing material) was obtained. Subsequently, the obtained reinforcing material was subjected to contact bonding performed by a roll heated to 125° C. Thereafter, the obtained reinforcing material was soaked in a 0.1 N aqueous sodium hydroxide solution to dissolve a dummy yarn (PVA yarn) alone and remove it from the reinforcing material. The thickness of the reinforcing material from which the dummy yarn was removed was 93 μm. The cation exchange membrane 8 shown in FIG. 9 was prepared in the same manner as in Example 1 except the above. The cation exchange membrane 8 had the membrane body (not shown) and two or more reinforcing core materials 80 arranged approximately in parallel within the membrane body. The membrane body had a structure where 4 elution holes were formed between the reinforcing core materials 80 adjacent to each other. More specifically, four elution holes 821, 822, 823, 824 were formed at respective intervals of a, b, $c_1$, $c_2$ between the reinforcing core materials 80.

In the obtained cation exchange membrane, in the TD direction, the distance a between the reinforcing core materials adjacent to each other was 1521 μm, the number n of elution holes provided between the adjacent reinforcing core materials was 4, the distance b of the reinforcing core material and the adjacent elution hole was 268 μm and the distance $c_1$ between the elution hole and the adjacent elution hole was 265 μm. The distance $c_2$ between the two elution holes at the center was 443 μm (see FIG. 9).

Furthermore, in the MD direction, elution holes were formed at equal intervals between the reinforcing core materials.

The physical properties of the obtained cation exchange membrane are shown in Table 3. As is shown in Table 3, it was confirmed that the cation exchange membrane had a high tensile elongation retaining rate in MD folding compared to Comparative Example 2. Furthermore, it was confirmed that the electrolysis voltage thereof was lower than that of Comparative Example 2.

Example 7

First, PTFE yarns were arranged at a rate of 24 yarns/inch at approximately equal intervals. MD yarns were prepared by use of a continuous 5-dent reed as follows. A bundle of 2 yarns consisting of PTFE yarn and PET yarn was passed through a first reed; a bundle of 2 yarns consisting of PET yarn and PET yarn was passed through a second reed; a bundle of 2 yarns consisting of PET yarn and PTFE yarn was passed through a third reed; a bundle of 2 yarns consisting of PET yarn and PET yarn was passed through a fourth reed; and a bundle of 2 yarns consisting of PET yarn and PET yarn was passed through a fifth reed. Weaving of the bundles of yarns in this combination was repeated in this order to obtain a plain weave. As to TD yarns, PTFE yarn, PET yarn, PVA yarn, PVA yarn, PET yarn, PET yarn, PVA yarn, PVA yarn and PET yarn were arranged in this order repeatedly and at approximately equal intervals to obtain a plain weave. In this manner, a woven fabric (reinforcing material) was obtained. Subsequently, the obtained reinforcing material was subjected to contact bonding performed by a roll heated to 125° C. Thereafter, the reinforcing material was soaked in a 0.1 N aqueous sodium hydroxide solution to dissolve a dummy yarn alone and remove it from the reinforcing material. The thickness of the reinforcing material from which the dummy yarn was removed was 93 μm. A cation exchange membrane was prepared in the same manner as in Example 6 except the above.

In the cation exchange membrane, in the TD direction, the distance a between the reinforcing core materials adjacent to each other was 1523 μm, the number n of elution holes provided between the adjacent reinforcing core materials was 4, the distance b of the reinforcing core material and the adjacent elution hole was 264 μm and the distance $c_1$ of the elution hole and the adjacent elution hole was 361 μm. The distance $c_2$ between the two elution holes at the center was 245 μm (see FIG. 9).

Furthermore, in the MD direction, elution holes were formed at equal intervals between the reinforcing core materials.

Comparative Example 2

A cation exchange membrane was produced having elution holes formed at equal intervals both in the MD direction and in the TD direction. As a reinforcing core material, a monofilament polytetrafluoroethylene (PTFE) of 90 deniers (PTFE yarn) was used. As a sacrifice yarn, 6-filament polyethylene terephthalate (PET) of 40 deniers twisted at a rate of 200 twists/m (PET yarn) was used.

First, PTFE yarns were arranged at a rate of 16 yarns/inch at equal intervals. As to MD yarn, PTFE yarn, PET yarn, PET yarn, PET yarn and PET yarn were arranged in this order repeatedly to obtain a plain weave. Also as to TD yarn, PTFE yarn, PET yarn, PET yarn, PET yarn and PET yarn were arranged repeatedly to obtain a plain weave thereby producing a woven fabric (reinforcing material). Subsequently, the obtained reinforcing material was subjected to contact bonding performed by a roll heated to 125° C. and controlled so as to have a thickness of 85 μm. A cation exchange membrane was obtained in the same manner as in Example 6 except the above.

In the cation exchange membrane, in the TD direction, the distance a between the reinforcing core materials adjacent to each other was 1517 μm, the number n of elution holes provided between the adjacent reinforcing core materials was 4, the distance b between the reinforcing core material and the adjacent elution hole was 303 μm and the distance $c_1$ between the elution hole and the adjacent elution hole was 303 μm. The distance $c_2$ between the two elution holes at the center was 303 μm (see FIG. 9).

Furthermore, in the MD direction, elution holes were formed at equal intervals between the reinforcing core materials.

The physical properties of the cation exchange membranes of Example 6, 7 and Comparative Example 2 are shown in Table 3. As shown in Table 3, in Example 6, 7, it was confirmed that the cation exchange membrane had a high tensile elongation retaining rate also after folding. Furthermore, as is shown in Table 3, when electrolysis was performed by using the cation exchange membrane of each Example, it was confirmed that electrolysis voltage was reduced compared to Comparative Example 2. Furthermore, when an electrolysis operation was performed for 7 days, electrolysis can be stably performed.

TABLE 3

| | | Example 6 | Example 7 | Comparative Example 2 |
|---|---|---|---|---|
| Reinforcing yarn | Material | PTFE | PTFE | PTFE |
| | Denier | 90 | 90 | 90 |
| | Filament | mono | mono | mono |
| Sacrifice yarn | Material | PET | PET | PET |
| | Denier | 30 | 40 | 40 |
| | Filament | 6 | 6 | 6 |
| | Twisting times | 200 | 200 | 200 |
| Dummy yarn | Material | PVA | PVA | PVA |
| | Denier | 36 | 36 | 36 |
| | Filament | 15 | 15 | 15 |
| | Twisting times | 200 | 200 | 200 |
| Thickness of reinforcing material (μm) | | 93 | 93 | 85 |
| | n | 4 | 4 | 4 |
| Yarn interval TD direction | a | 1521 | 1523 | 1517 |
| | b | 268 | 264 | 303 |
| | $c_1$ | 265 | 361 | 303 |
| | $c_2$ | 443 | 245 | 303 |
| | $c_1/(a/(n+1))$ | 0.9 | 1.2 | 1.0 |
| | $c_2/(a/(n+1))$ | 1.5 | 0.8 | 1.0 |
| Folding resistance (%) (Tensile elongation retention rate (%)) | MD Folding | 44 | 44 | 28 |
| Electrolysis voltage (V) | | 3.26 | 3.26 | 3.31 |

From the above, it was demonstrated that the cation exchange membrane of each Example was excellent in mechanical strength against folding, etc. As a result, it was demonstrated that electrolytic performance could be stably delivered for a long time. Furthermore, it was demonstrated that in the case where the cation exchange membrane of each Example was used, electrolysis voltage could be reduced compared to the case where the cation exchange membrane having the reinforcing core materials where elution holes were formed at equal intervals, and that excellent electrolytic performance could be delivered.

Example 8

First, PTFE yarns were arranged at a rate of 24 yarns/inch at approximately equal intervals. MD yarns were prepared by use of a continuous 5-dent reed as follows. A bundle of 2 yarns consisting of PTFE yarn and PET yarn was passed through a first reed; a bundle of 2 yarns consisting of PET yarn and PET yarn was passed through a second reed; a bundle of 2 yarns consisting of PET yarn and PTFE yarn was passed through a third reed; a bundle of 2 yarns consisting of PET yarn and PET yarn was passed through a fourth reed; and a bundle of 2 yarns consisting of PET yarn and PET yarn was passed through a fifth reed. Weaving of the bundles of yarns in this combination was repeated in this order to obtain a plain weave. As to TD yarns, PTFE yarn, PVA yarn, PVA yarn, PET yarn, PET yarn, PET yarn, PET yarn, PVA yarn and PVA yarn were arranged in this order repeatedly and at approximately equal intervals to obtain a plain weave. In this manner, a woven fabric (reinforcing material) was obtained. Subsequently, the obtained reinforcing material was subjected to contact bonding performed by a roll heated to 125° C. Thereafter, the reinforcing material was soaked in a 0.1 N aqueous sodium hydroxide solution to dissolve a dummy yarn (PVA yarn) alone and remove it from the reinforcing material. The thickness of the reinforcing material from which the dummy yarn was removed was 95 μm. A cation exchange membrane was prepared in the same manner as in Example 1 except the above.

In the obtained cation exchange membrane, in the TD direction, the distance a between the reinforcing core materials adjacent to each other was 1559 μm, the number n of elution holes provided between the adjacent reinforcing core materials was 4, the distance b of the reinforcing core material and the adjacent elution hole was 463 μm and the distance $c_1$ of the elution hole and the adjacent elution hole was 206 μm. The distance $c_2$ between the two elution holes at the center was 180 μm (see FIG. 9).

Example 9

First, PTFE yarns were arranged at a rate of 24 yarns/inch at approximately equal intervals. MD yarns were prepared by use of a continuous 5-dent reed as follows. A bundle of 2 yarns consisting of PTFE yarn and PET yarn was passed through a first reed; a bundle of 2 yarns consisting of PET yarn and PET yarn was passed through a second reed; a bundle of 2 yarns consisting of PET yarn and PTFE yarn was passed through a third reed; a bundle of 2 yarns consisting of PET yarn and PET yarn was passed through a fourth reed; and a bundle of 2 yarns consisting of PET yarn and PET yarn was passed through a fifth reed. Weaving of the bundles of yarns in this combination was repeated in this order to obtain a plain weave. As to TD yarns, PTFE yarn, PET yarn, PET yarn, PVA yarn, PVA yarn, PET yarn, PET yarn, PTFE yarn, PET yarn, PVA yarn, PVA yarn, PET yarn, PET yarn, PVA yarn, PVA yarn and PET yarn were arranged in this order repeatedly and at approximately equal intervals to obtain a plain weave. In this manner, a woven fabric (reinforcing material) was obtained. Subsequently, the obtained reinforcing material was subjected to contact bonding performed by a roll heated to 125° C. Thereafter, the reinforcing material was soaked in a 0.1 N aqueous sodium hydroxide solution to dissolve a dummy yarn (PVA yarn) alone and remove it from the reinforcing material. The thickness of the reinforcing material from which the dummy yarn was removed was 92 μm. The cation exchange membrane was prepared in the same manner as in Example 1 except the above.

In the obtained cation exchange membrane, in the TD direction, the distance a between the reinforcing core materials adjacent to each other was 1743 μm, the number n of elution holes provided between the adjacent reinforcing core materials was 4, the distance b between the reinforcing core material and the adjacent elution hole was 201 μm and the distance $c_1$ between the elution hole and the adjacent elution hole was 470 μm. The distance $c_2$ between the two elution holes at the center was 255 μm (see FIG. 9).

Furthermore, in the case where the distance a between the reinforcing core materials adjacent to each other was 1387 μm, the number n of elution holes provided between the adjacent reinforcing core materials was 4 and the distance b between the reinforcing core material and the adjacent elution hole was 228 μm and the distance $c_1$ between the elution hole and the adjacent elution hole was 462 μm. The distance $c_2$ between the two elution holes at the center was 218 μm (see FIG. 9).

The physical properties of the cation exchange membranes of Examples 8 and 9 are shown in Table 4. Note that, the symbol "-" in the table indicates that no corresponding substance was present in the Examples and Comparative Examples.

TABLE 4

| | | | Example 8 | Example 9 |
|---|---|---|---|---|
| Reinforcing yarn | Material | | PTFE | PTFE |
| | Denier | | 90 | 90 |
| | Filament | | mono | mono |
| Sacrifice yarn | Material | | PET | PET |
| | Denier | | 40 | 40 |
| | Filament | | 6 | 6 |
| | Twisting times | | 200 | 200 |
| Dummy yarn | Material | | PVA | PVA |
| | Denier | | 36 | 36 |
| | Filament | | 15 | 15 |
| | Twisting times | | 200 | 200 |
| Thickness of reinforcing material (μm) | | | 95 | 92 |
| | N | | 4 | 4 |
| Yarn interval (TD direction) | T1 | A | 1559 | 1743 |
| | | B | 463 | 201 |
| | | $c_1$ | 206 | 470 |
| | | $c_2$ | 180 | 255 |
| | | $c_1/(a/(n+1))$ | 0.66 | 1.35 |
| | | $c_2/(a/(n+1))$ | 0.58 | 0.73 |
| | T2 | A | — | 1387 |
| | | B | — | 228 |
| | | $c_1$ | — | 462 |
| | | $c_2$ | — | 218 |
| | | $c_1/(a/(n+1))$ | — | 1.67 |
| | | $c_2/(a/(n+1))$ | — | 0.79 |

As evaluation of mechanical strength, the cation exchange membrane was folded by applying weight of 400 g/cm² so as to allow the surface of the carboxylic acid layer side (see FIG. 1, the carboxylic acid layer 144, and "polymer A layer" described above) to face inside and the presence or absence of e.g., pinhole formation was observed. In the obtained cation exchange membrane of Examples 8 and 9, formation of a pinhole by folding was not confirmed. In addition, it was discovered that stable electrolytic performance can be delivered for a long time.

This application is based on Japanese Patent Application No. 2009-245869 which was filed with Japan Patent Office on Oct. 26, 2009, which is hereby incorporated by reference herein.

INDUSTRIAL APPLICABILITY

The cation exchange membrane of the present invention can be suitably used as the cation exchange membrane for alkali chloride electrolysis, etc.

REFERENCE SIGNS LIST 1, 2, 3, 4, 5 . . . Cation exchange membrane,
6 . . . Reinforcing material,
10, 20x, 20y, 301, 302, 303, 401, 402, 403, 501x, 501y, 502x, 502y, 503x, 503y, 60 . . . Reinforcing core material,
12, 12a, 12b, 22x, 22y, 321, 322, 323, 324, 325, 326, 421, 422, 423, 424, 521x, 521y, 522x, 522y, 523x, 523y, 524x, 524y . . . Elution holes,
14 . . . Membrane body,
62 . . . Sacrifice yarn,
66 . . . Dummy yarn,
142 . . . Sulfonic acid layer,
144 . . . Carboxylic acid layer,
146, 148 . . . Coating layer,
A . . . Electrolysis vessel,
A1 . . . Anode,
A2 . . . Cathode,
α . . . Anode side,
β . . . Cathode side,
X . . . MD direction,
Y . . . TD direction

What is claimed is:

1. A method for producing a cation exchange membrane, comprising the steps of:
  weaving two or more reinforcing core materials, a sacrifice yarn soluble in an acid or an alkali, and a dummy yarn soluble in a predetermined solvent in which the reinforcing core materials and the sacrifice yarn are insoluble, to obtain a reinforcing material having the sacrifice yarn and the dummy yarn arranged between the reinforcing core materials adjacent to each other;
  soaking the reinforcing material in the predetermined solvent to remove the dummy yarn from the reinforcing material;
  stacking the reinforcing material from which the dummy yarn is removed and a fluorine-based polymer having an ion-exchange group or an ion-exchange group precursor which can be converted into the ion-exchange group by hydrolysis, to form a membrane body having the reinforcing material; and
  soaking the sacrifice yarn in an acid or an alkali to remove the sacrifice yarn from the membrane body, thereby forming an elution hole in the membrane body.

* * * * *